US008390552B2

(12) United States Patent
Miyashita

(10) Patent No.: US 8,390,552 B2
(45) Date of Patent: Mar. 5, 2013

(54) DISPLAY DEVICE, AND CIRCUIT AND METHOD FOR DRIVING THE SAME

(75) Inventor: Toshihiko Miyashita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1336 days.

(21) Appl. No.: 11/991,309

(22) PCT Filed: May 25, 2006

(86) PCT No.: PCT/JP2006/310430
§ 371 (c)(1),
(2), (4) Date: May 8, 2008

(87) PCT Pub. No.: WO2007/029381
PCT Pub. Date: Mar. 15, 2007

(65) Prior Publication Data
US 2008/0231641 A1   Sep. 25, 2008

(30) Foreign Application Priority Data

Sep. 1, 2005   (JP) ................................. 2005-253665

(51) Int. Cl.
*G09G 3/36*   (2006.01)
(52) U.S. Cl. ............................... 345/90; 345/95; 345/98
(58) Field of Classification Search .................. None
See application file for complete search history.

(56) References Cited

U.S. PATENT DOCUMENTS

| | | | | |
|---|---|---|---|---|
| 5,396,245 | A | * | 3/1995 | Rempfer ........................ 341/145 |
| 5,568,146 | A | * | 10/1996 | Park ............................. 341/145 |
| 6,864,871 | B1 | * | 3/2005 | Okada et al. ................... 345/90 |
| 6,999,016 | B2 | * | 2/2006 | Haga et al. .................... 341/144 |

(Continued)

FOREIGN PATENT DOCUMENTS

| | | |
|---|---|---|
| JP | H05-119742 | 5/1993 |
| JP | 05-216443 | 8/1993 |
| JP | H07-020829 | 1/1995 |
| JP | 08-248389 | 9/1996 |
| JP | H10-293284 | 11/1998 |
| JP | 2001-188217 | 7/2001 |
| JP | 2001-265287 | 9/2001 |
| JP | 2002-358050 | 12/2002 |
| JP | 2003-216117 | 7/2003 |

OTHER PUBLICATIONS

Office Action for corresponding U.S. Appl. No. 12/084,261 dated Sep. 27, 2011.
Office Action for corresponding U.S. Appl. No. 12/084,261 dated Apr. 4, 2011.

*Primary Examiner* — William Boddie
*Assistant Examiner* — Alecia D English
(74) *Attorney, Agent, or Firm* — Harness, Dickey & Pierce, P.L.C.

(57) ABSTRACT

In one embodiment of the present application, a display is disclosed in which any defective pixel is rendered less noticeable even if a full-screen white display or suchlike is effected. In a normally-white liquid crystal display device, which transitions after power activation from non-display state through display starting state, where a full-screen blank white display is effected, to normal display state, an auxiliary electrode driver portion controls an auxiliary capacitance line voltage $V_{cs}$ to be applied to auxiliary capacitance lines in accordance with the state of the liquid crystal display device in the following manner. Specifically, during the display starting state, the voltage difference between the auxiliary capacitance line voltage $V_{cs}$ and a counter voltage $V_{com}$ is set at 0, such that any defective pixel is displayed in white, whereas during the normal display state, a predetermined voltage difference $\Delta V_c$ is caused between the auxiliary capacitance line voltage $V_{cs}$ and the counter voltage $V_{com}$, such that any defective pixel is displayed in black. The present invention is suitable for active-matrix liquid crystal display devices.

3 Claims, 9 Drawing Sheets

U.S. PATENT DOCUMENTS

| | | |
|---|---|---|
| 7,026,971 B2 * | 4/2006 | Horsky et al. .................. 341/145 |
| 7,256,778 B1 | 8/2007 | Choi |
| 7,477,332 B2 | 1/2009 | Park et al. |
| 7,639,849 B2 * | 12/2009 | Kimpe et al. .................. 382/128 |
| 2002/0008685 A1 | 1/2002 | Ban et al. |
| 2002/0057392 A1 | 5/2002 | Ha |
| 2003/0117359 A1 | 6/2003 | Park |
| 2004/0032544 A1 | 2/2004 | Kim et al. |
| 2004/0085284 A1 | 5/2004 | Chen et al. |
| 2006/0017674 A1 * | 1/2006 | Kamada .......................... 345/87 |
| 2007/0057977 A1 | 3/2007 | Shih et al. |

* cited by examiner

Fig.2
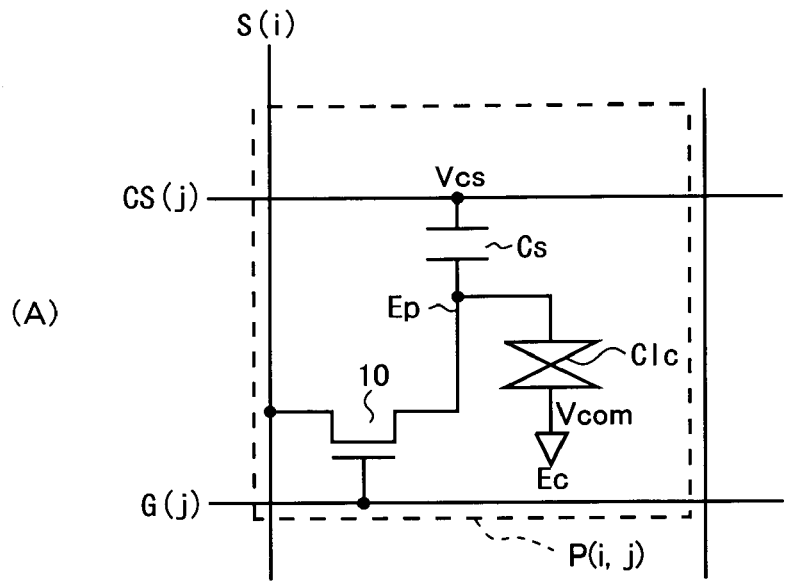
(A)
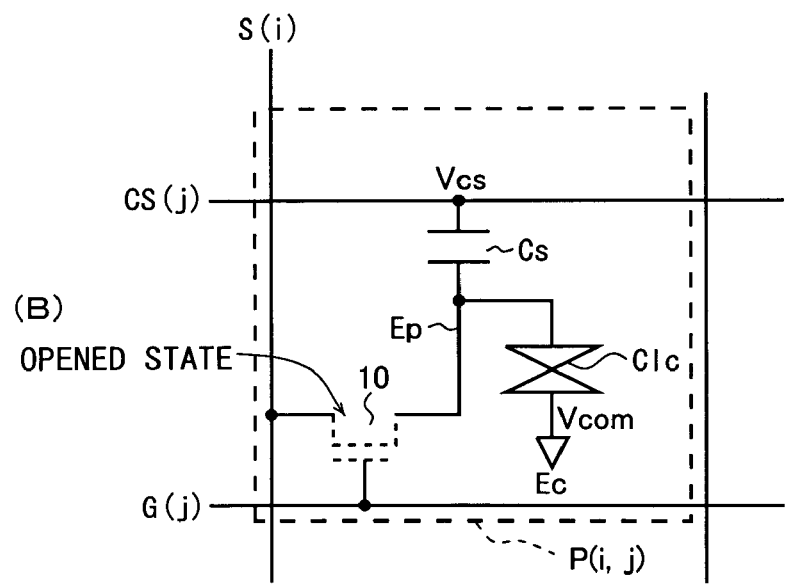
(B) OPENED STATE
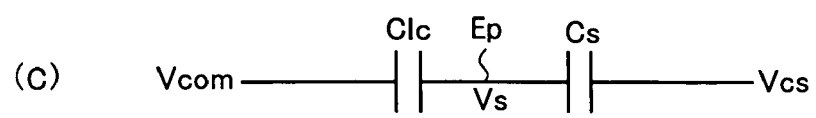
(C)

DISPLAY DATA BEING TRANSFERRED (A) NON-DISPLAY STATE (B) DISPLAY STARTING STATE
(ABNORMAL DISPLAY DUE TO REMAINING CHARGE)

(C) NORMAL DISPLAY STATE

DISPLAY DATA BEING TRANSFERRED (A) NON-DISPLAY STATE (B) DISPLAY STARTING STATE (BLANK DISPLAY)
Pdft DEFECTIVE PIXEL (C) NORMAL DISPLAY STATE
Pdft DEFECTIVE PIXEL Fig. 17
(A)
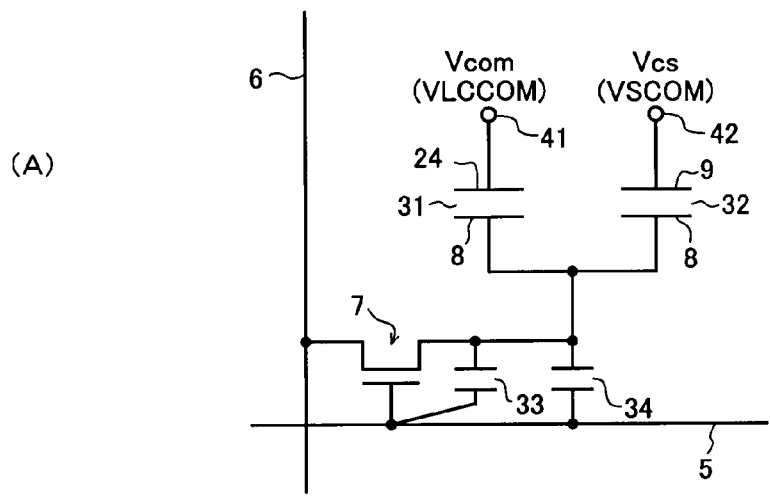
(B)
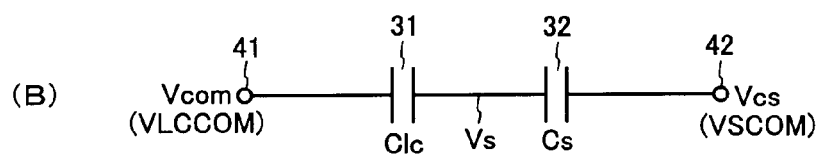
Fig. 18
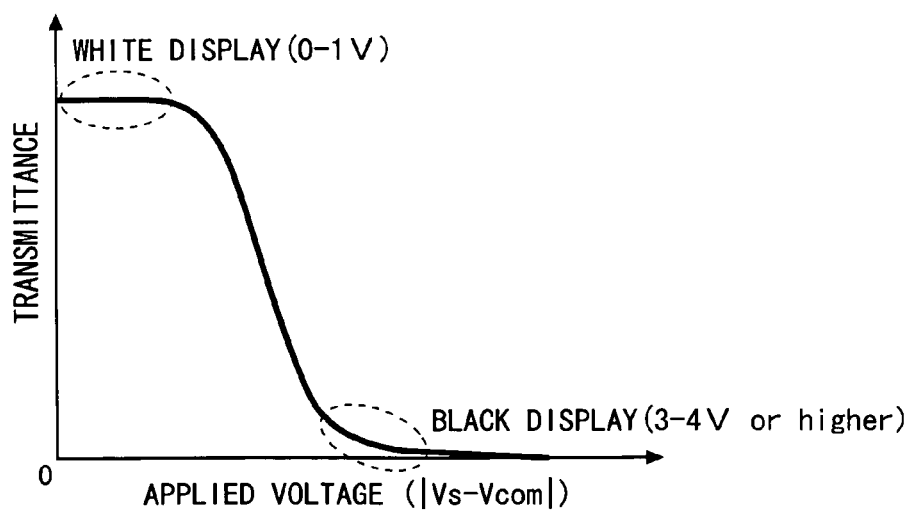

US 8,390,552 B2

DISPLAY DEVICE, AND CIRCUIT AND METHOD FOR DRIVING THE SAME

TECHNICAL FIELD

The present invention relates to a display device, such as a liquid crystal display device, in which an image is displayed by applying a voltage between a plurality of pixel electrodes and a common electrode being opposed thereto, and more specifically, the present invention relates to a drive method and suchlike for rendering any defective pixel less noticeable in such a display device.

BACKGROUND ART

The flat-panel display devices that are widely used at present are active-matrix liquid crystal display devices using thin-film transistors (TFTs) (hereinafter, referred to as "TFT-LCD devices").

The liquid crystal panel of the TFT-LCD device includes a pair of opposing substrates (hereinafter referred to as "first and second substrates"). These substrates are fixed at a predetermined distance from each other, and a liquid crystal material is filled in between the substrates to form a liquid crystal layer. At least one of the substrates is transparent; in order to effect a transmissive display, the substrates are both required to be transparent. The TFT-LCD device has a plurality of parallel scanning signal lines provided on the first substrate, and a plurality of data signal lines provided perpendicular to the scanning signal lines. Provided at each intersection between the scanning signal lines and the data signal lines are a pixel electrode, and a pixel TFT, which is a switching element for electrically connecting the pixel electrode to the data signal line. The pixel TFT has a gate terminal connected to the scanning signal line, a source terminal connected to the data signal line, and a drain terminal connected to the pixel electrode.

A common electrode is provided as a counter electrode over the entirety of the second substrate being opposed to the first substrate, and liquid crystal capacitances are formed by the pixel electrodes on the first substrate, the common electrode on the second substrate, and liquid crystal sandwiched therebetween. In addition, auxiliary capacitance lines are provided on the first substrate so as to cross the pixel electrodes, and auxiliary capacitances are formed by the pixel electrodes and the auxiliary capacitance lines.

A data signal line driver circuit, a scanning signal line driver circuit, a common electrode driver circuit, and an auxiliary capacitance line driver circuit are provided in order to respectively drive the data signal lines, the scanning signal lines, the common electrode, and the auxiliary capacitance lines. In addition, the data signal line driver circuit and the scanning signal line driver circuit apply a voltage to each pixel electrode in accordance with an image to be displayed, and a common electrode driver portion and an auxiliary capacitance line driver portion respectively apply an appropriate voltage to the common electrode and the auxiliary capacitance lines. As a result, the voltage that corresponds to the value of each pixel for the image to be displayed is held by the liquid crystal capacitance and the auxiliary capacitance, which are formed by the pixel electrode associated with that pixel, and the voltage that corresponds to the difference in potential between the pixel electrode and the common electrode is applied to the liquid crystal layer.

The applied voltage makes it possible to control the optical transmittance of the liquid crystal layer, and thereby to display the image in accordance with the voltage supplied to each pixel electrode.

[Patent Document 1] Japanese Laid-Open Patent. Publication No. 8-248389

DISCLOSURE OF THE INVENTION

Problems to be Solved by the Invention

Incidentally, in the case of the liquid crystal display device as described above, when the power is shut off (at the time of power-off), the charge that has accumulated in the liquid crystal panel because of previously displayed images remains, and thereafter when the power is supplied (at the time of power-on), in some cases, an abnormal display might be effected due to the remaining charge until an original display based on display data (hereinafter, referred to as a "normal display") is started, as shown in FIG. 15. There is a known method for preventing this, in which a blank display is effected during a period between activation of the liquid crystal display device, for example, by supplying the power, and start of the normal display (a period in which the liquid crystal display device transitions from non-display state to normal display state; hereinafter, the state of the liquid crystal display device during this period is referred to as the "display starting state"). According to this method, for example, in the case of a liquid crystal display device including a normally-white liquid crystal panel, a full-screen white display is effected during a period between supplying of the power and starting of the normal display (a period between the non-display state and the normal display state), and during that period, display data is transferred to the data signal line driver circuit in the liquid crystal display device before a display (normal display) is started based on the display data, as shown in FIG. 16.

On the other hand, there is a known method in which, when a pixel TFT has been brought into an opened state, for example, due to a manufacture defect of the liquid crystal panel, a defective pixel, which is a pixel to be displayed by a pixel electrode connected to that pixel TFT (hereinafter, referred to as the "open fault TFT"), is displayed in black (as a black dot), thereby rendering the defective pixel less noticeable (see, for example, Japanese Laid-Open Patent Publication No. 8-248389 (Patent Document 1)).

However, if such a method for rendering the defective pixel into a black dot (hereinafter, referred to as a-"defective-pixel-to-black-dot rendering method") is applied to the liquid crystal display device that effects a full-screen white display as a blank display during the display starting state as shown in FIG. 16, any defective pixel $P_{dft}$ is displayed as a black dot, which is noticeable, during the display starting state.

For example, in the case where the liquid crystal display device disclosed in Japanese Laid-Open Patent Publication No. 8-248389 is used as the liquid crystal display device according to the defective-pixel-to-black-dot rendering method, the following is conceivable. In this liquid crystal display device, an equivalent circuit for a portion of the liquid crystal panel that forms a single pixel is configured as shown in (A) of FIG. 17. Specifically, a TFT 7, which acts as a switching element, and pixel electrodes 8 are formed in the vicinity of an intersection between a signal line 6 and a scanning line 5, such that the pixel electrodes 8 are connected to the signal line via the TFT 7, which has a gate terminal connected to the scanning line. In addition, a pixel capacitance portion 31 and an auxiliary capacitance portion 32 are respectively formed between one of the pixel electrodes 8 and a common electrode 24, and between the other pixel electrode 8 and an auxiliary capacitance line 9. Moreover, the common electrode 24 is connected to a high-tension power source 41, and the auxiliary capacitance line 9 is connected to a low-tension power source 42. Note that parasitic capacitance portions 33 and 34 are provided between the pixel electrodes 8 and the scanning line 5.

Here, if the TFT 7 has been brought into an opened state due to a manufacture defect, the equivalent circuit for a portion that forms a single pixel is configured as shown in (B) of FIG. 17. In this case, the voltage difference between a voltage $V_{com}$ on the counter electrode side of the liquid crystal panel (a voltage at the common electrode 24) and a voltage $V_{cs}$ on the auxiliary capacitance electrode side (a voltage at the auxiliary capacitance line 9) is divided by the capacitance ratio between a liquid crystal capacitance $C_{lc}$ and an auxiliary capacitance $C_s$, and the resultant voltage from that division is applied to the liquid crystal. For example, if $V_{com}=5$ [V] $V_{cs}=9$ [V], and the capacitance ratio $C_{lc}/C_s=1/3$, then a pixel electrode voltage $V_s=8$ [V], so that the voltage applied to the liquid crystal $|V_s-V_{com}|=3$ [V]. Here, if a curve illustrating the relationship between the voltage applied to the liquid crystal and the transmittance of the liquid crystal (hereinafter, referred to as a "VT curve") is given as in FIG. 18, light from the defective pixel is almost blocked, so that a black dot appears. As a result, when the full-screen white display is effected as a blank display, the defective pixel that appears as a black dot is noticeable.

Therefore, an objective of the present invention is to provide a display device in which any defective pixel is rendered less noticeable even if a full-screen white display or such like is effected, and also to provide a circuit and a method for driving the same.

Solution to the Problems

A first aspect of the present invention is directed to a display device for displaying an image in accordance with differences in potential between a plurality of pixel electrodes and a common electrode provided in common for the pixel electrodes, the device comprising:
   switching elements provided in association with their respective pixel electrodes;
   auxiliary electrodes provided so as to form predetermined capacitances between the auxiliary electrodes and the pixel electrodes;
   a pixel electrode driver portion for supplying a voltage according with an image to be displayed to the pixel electrodes via the switching elements associated therewith;
   a common electrode driver portion for supplying a predetermined counter voltage to the common electrode; and
   an auxiliary electrode driver portion for supplying a predetermined auxiliary voltage to the auxiliary electrodes,
      wherein the auxiliary electrode driver portion includes:
         an auxiliary voltage generation portion for generating the auxiliary voltage such that a voltage difference occurs between the auxiliary voltage and the counter voltage; and
         a voltage difference control portion for altering the voltage difference in accordance with the image to be displayed, so as to render a defective pixel less noticeable, the defective pixel being displayed by a pixel electrode associated with an open fault switching element from among the switching elements that has been brought into an opened state due to a fault.

In a second aspect of the present invention, based on the first aspect of the invention, the voltage difference control portion controls the voltage difference such that:
   when the image to be displayed is a full-screen white display image, a voltage corresponding to a white display is applied between the pixel electrode associated with the open fault switching element and the common electrode; and
   when the image to be displayed is not a full-screen white display image, a voltage corresponding to a black display is applied between the pixel electrode associated with the open fault switching element and the common electrode.

In a third aspect of the present invention, based on the first aspect of the invention, when a full-screen white display image is displayed for a predetermined period at the time of turning the display device on or off, the voltage difference control portion controls the voltage difference such that:
   a voltage corresponding to a white display is applied between the pixel electrode associated with the open fault switching element and the common electrode during the predetermined period; and
   a voltage corresponding to a black display is applied between the pixel electrode associated with the open fault switching element and the common electrode during a period other than the predetermined period.

In a fourth aspect of the present invention, based on the first aspect of the invention, the device further comprises a determination portion for determining whether a white display is dominant in the image to be displayed, and
   when the determination portion determines that the white display is dominant the voltage difference control portion controls the voltage difference such that a voltage corresponding to the white display is applied between the pixel electrode associated with the open fault switching element and the common electrode.

In a fifth aspect of the present invention, based on the first aspect of the invention, the auxiliary voltage generation portion includes:
   a capacitor having one end to which the counter voltage or a voltage equal in alternating current to the counter voltage is supplied; and
   a diode connected at one end to the other end of the capacitor,
   the auxiliary electrode driver portion outputs a voltage at said other end of the capacitor as the auxiliary voltage, and
   the voltage difference control portion generates and supplies a predetermined clamp voltage to the other end of the diode, and changes a value of the clamp voltage, thereby altering the voltage difference.

In a sixth aspect of the present invention, based on the fifth aspect of the invention, the auxiliary voltage generation portion has a resistor element connected in parallel to the capacitor.

In a seventh aspect of the present invention, based on the fifth aspect of the invention, the auxiliary voltage generation portion has a resistor element connected between said other end of the capacitor and a ground point.

In an eighth aspect of the present invention, based on the fifth aspect of the invention, the auxiliary voltage generation portion has a switch connected in parallel to the capacitor, and
   the switch is opened/closed depending on whether the voltage difference is required.

In a ninth aspect of the present invention, based on the fifth aspect of the invention, the auxiliary voltage generation portion has a switch connected between said other end of the capacitor and a ground point, and the switch is opened/closed depending on whether the voltage difference is required.

A tenth aspect of the present invention is directed to a driver circuit for use in a display device including a plurality of pixel electrodes, a common electrode provided in common for the pixel electrodes so as to form first capacitances between the common electrode and the pixel electrodes, and auxiliary electrodes provided so as to form second capacitances between the auxiliary electrodes and the pixel electrodes, the display device displaying an image in accordance with differences in potential between the pixel electrodes and the common electrode, the circuit comprising:

a pixel electrode driver portion for supplying a voltage according with the image to the pixel electrodes;

a common electrode driver portion for supplying a predetermined counter voltage to the common electrode; and an auxiliary electrode driver portion for supplying a predetermined auxiliary voltage to the auxiliary electrodes, wherein the auxiliary electrode driver portion includes:

an auxiliary voltage generation portion for generating the auxiliary voltage such that a voltage difference occurs between the auxiliary voltage and the counter voltage; and a voltage difference control portion for altering the voltage difference.

In an eleventh aspect of the present invention, based on the tenth aspect of the invention, the auxiliary voltage generation portion includes:

a capacitor having one end to which the counter voltage or a voltage equal in alternating current to the counter voltage is supplied; and a diode connected at one end to the other end of the capacitor, the auxiliary electrode driver portion outputs a voltage at said other end of the capacitor as the auxiliary voltage, and the voltage difference control portion generates and supplies a predetermined clamp voltage to the other end of the diode, and changes a value of the clamp voltage, thereby altering the voltage difference.

A twelfth aspect of the present invention is directed to a drive method for use with a display device including a plurality of pixel electrodes, switching elements provided in association with their respective pixel electrodes, a common electrode provided in common for the pixel electrodes so as to form first capacitances between the common electrode and the pixel electrodes, and auxiliary electrodes provided so as to form second capacitances between the auxiliary electrodes and the pixel electrodes, the display device displaying an image in accordance with differences in potential between the pixel electrodes and the common electrode, the method comprising:

a pixel electrode driving step of supplying a voltage according with the image to the pixel electrodes via the switching elements associated therewith;

a common electrode driving step of supplying a predetermined counter voltage to the common electrode; and an auxiliary electrode driving step of supplying a predetermined auxiliary voltage to the auxiliary electrodes, wherein the auxiliary electrode driving step involves:

generating the auxiliary voltage such that a voltage difference occurs between the auxiliary voltage and the counter voltage; and altering the voltage difference in accordance with the image to be displayed, so as to render a defective pixel less noticeable, the defective pixel being displayed by a pixel electrode associated with an open fault switching element from among the switching elements that has been brought into an opened state due to a fault.

In a thirteenth aspect of the present invention, based on the twelfth aspect of the invention, the auxiliary electrode driving step includes:

the step of controlling, for the case where the image to be displayed is a full-screen white display image, the voltage difference such that a voltage corresponding to a white display is applied between the pixel electrode associated with the open fault switching element and the common electrode, and the step of controlling, for the case where the image to be displayed is not a full-screen white display image, the voltage difference such that a voltage corresponding to a black display is applied between the pixel electrode associated with the open fault switching element and the common electrode.

In a fourteenth aspect of the present invention, based on the twelfth aspect of the invention, when a full-screen white display image is displayed for a predetermined period at the time of turning the display device on or off, the voltage difference control step involves:

controlling the voltage difference such that a voltage corresponding to a white display is applied between the pixel electrode associated with the open fault switching element and, the common electrode during the predetermined period; and controlling the voltage difference such that a voltage corresponding to a black display is applied between the pixel electrode associated with the open fault switching element and the common electrode during a period other than the predetermined period.

In a fifteenth aspect of the present invention, based on the twelfth aspect of the invention, the method further comprises the step of determining whether a white display is dominant in the image to be displayed, and when the white display is determined to be dominant, the voltage difference is controlled in the auxiliary electrode driving step, such that a voltage corresponding to the white display is applied between the pixel electrode associated with the open fault switching element and the common electrode.

Effect of the Invention

According to the first or twelfth aspect of the invention, the auxiliary voltage is generated such that the voltage difference occurs between the auxiliary voltage and the counter voltage, and the voltage difference is altered in accordance with the image to be displayed, in order to render any defective pixel less noticeable. As a result, the defective pixel is displayed in, for example, black or white in accordance with the image to be displayed, and therefore, it is possible to render the defective pixel less noticeable not only during the normal display state, but also, for example, during the full-screen blank white display where a white display is dominant.

According to the second or thirteenth aspect of the invention, in the case where the image to be displayed is a full-screen white display image, the defective pixel is displayed in white, whereas in the case where the image to be displayed is not a full-screen white display image, the defective pixel is displayed in black. Accordingly, during the normal display state, the defective pixel is rendered less noticeable by displaying it in black, and even during the full-screen white display (blank display), the defective pixel is rendered less noticeable by displaying it in white.

According to the third or fourteenth aspect of the invention, in the case where a full-screen white display image is displayed for a predetermined period at the time of turning the display device on or off, in order to prevent any abnormal display due to remaining charge in the display panel, the defective pixel is displayed in white during the predetermined period, and therefore the defective pixel can also be rendered less noticeable during such a period. Specifically, it is possible to prevent any abnormal display due to the remaining charge, and to render the defective pixel less noticeable, not only during the normal display state but also during the display starting state and the completion display state.

According to the fourth or fifteenth aspect of the invention, when the white display is dominant, the defective pixel is displayed in white, and therefore it is possible to render the defective pixel less noticeable by displaying it in white not only in the case where the full-screen blank white display is effected during the display starting state or the completion display state, but also in the case where the white display is dominant during the normal display state.

According to the fifth aspect of the invention, an auxiliary voltage is generated by a clamp circuit including a capacitor and a diode, such that a voltage difference occurs between the auxiliary voltage and the counter voltage. Specifically, in the case where the cathode of the diode is connected to the capacitor, the auxiliary voltage is generated so as to have a lower limit equal to the clamp voltage, whereas in the case where the anode of the diode is connected to the capacitor, the auxiliary voltage is generated so as to have an upper limit equal to the clamp voltage. Accordingly, the voltage difference is altered by changing the value of the clamp voltage. Thus, it is possible to achieve the same effect as that achieved by the first aspect of the invention by changing the value of the clamp voltage in accordance with the image to be displayed.

According to the sixth aspect of the invention, the resistor element is connected in parallel to the capacitor included in the clamp circuit, and therefore even when the clamp voltage is changed from a clamp voltage value at which the voltage difference between the counter voltage and the auxiliary voltage is relatively large to a clamp voltage value at which the voltage difference is 0, the capacitor is quickly discharged via the resistor element. Since discharging of the capacitor is accelerated in such a manner, it is possible to prevent any malfunction such as an abnormal display due to remaining charge in the capacitor.

According to the seventh aspect of the invention, the resistor element is connected between the aforementioned other end of the capacitor included in the clamp circuit and the ground point, and therefore the counter voltage is also equal to the ground voltage when the power is shut off, making it possible to achieve an effect similar to that achieved by the sixth aspect of the invention.

According to the eighth aspect of the invention, the switch is connected in parallel to the capacitor included in the clamp circuit, and the switch is opened/closed depending on whether the voltage difference is required between the counter voltage and the auxiliary voltage, so that even when the clamp voltage is changed from a clamp voltage value at which the voltage difference is relatively large to a clamp voltage value at which the voltage difference is 0, the capacitor can be quickly discharged via the switching element. Thus, it is possible to prevent any malfunction such as an abnormal display due to remaining charge in the capacitor.

According to the ninth aspect of the invention, the switch is connected between the aforementioned other end of the capacitor included in the clamp circuit and the ground point, and the switch is opened/closed depending on whether the voltage difference is required between the counter voltage and the auxiliary voltage, so that the counter voltage is also equal to the ground voltage when the power is shutoff, making it possible to achieve an effect similar to that achieved by the eighth aspect of the invention.

According to the tenth aspect of the invention, the auxiliary voltage is generated by the auxiliary voltage generation portion, such that a voltage difference occurs between the auxiliary voltage and the counter voltage, and the voltage difference is altered by the voltage difference control portion, so that any defective pixel can be displayed in, for example, black or white in accordance with the image to be displayed. Thus, it is possible to render the defective pixel less noticeable not only during the normal display state, but also, for example, during the full-screen blank white display where a white display is dominant.

According to the eleventh aspect of the invention, the auxiliary voltage is generated by a clamp circuit including a capacitor and a diode, such that a voltage difference occurs between the auxiliary voltage and the counter voltage, and the voltage difference can be altered by changing the value of the clamp voltage. Thus, it is possible to achieve the same effect as that achieved by the tenth aspect of the invention by changing the value of the clamp voltage in accordance with the image to be displayed.

BRIEF DESCRIPTION OF THE DRAWINGS

FIG. 2 consists of circuit diagrams (A, B, C), each illustrating an equivalent circuit (pixel circuit) for a pixel formation portion in the first embodiment.

FIG. 17 consists of circuit diagrams (A, B) for describing a conventional technique in which a defective pixel caused by a manufacture defect of the liquid crystal panel is rendered less noticeable.

FIG. 18 is a characteristics graph illustrating the relationship (V-T curve) between applied voltage and transmittance in the liquid crystal panel.

DESCRIPTION OF THE REFERENCE CHARACTERS

Figure 1:
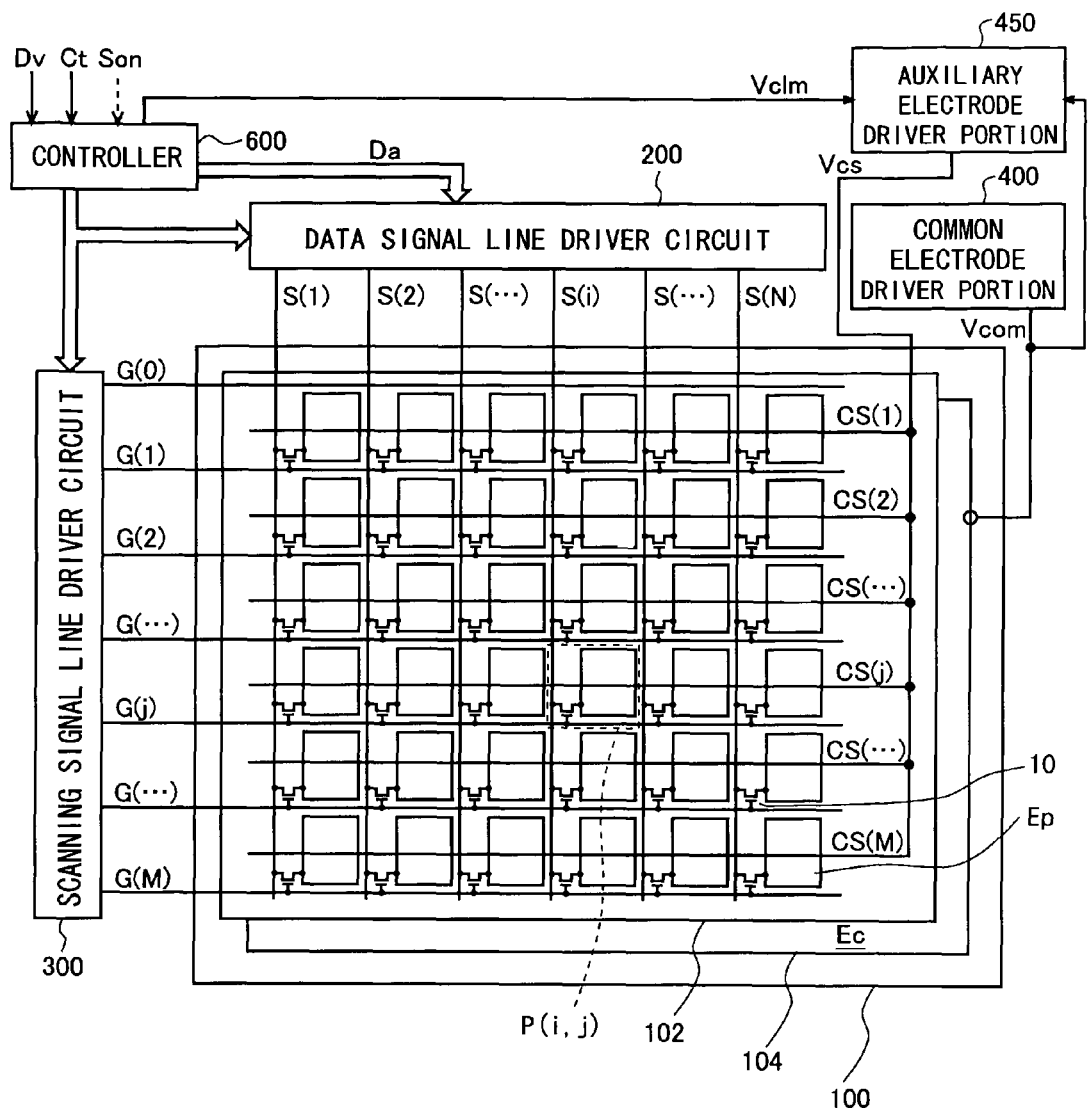
FIG. 1 is a block diagram illustrating the configuration of a liquid crystal display device according to a first embodiment of the present invention.

10 . . . TFT (switching element)
100 . . . liquid crystal panel
102 . . . TFT substrate
104 . . . counter substrate
200 . . . data signal line driver circuit
300 . . . scanning signal line driver circuit
400 . . . common electrode driver portion
403 . . . DC/DC converter
450 . . . auxiliary electrode driver portion
451 . . . clamp voltage control portion
455 . . . DC/DC converter
461 . . . voltage setting register
600 . . . controller
$C_1$ . . . capacitor
$D_1$ . . . diode
$R_d$ . . . discharge resistor element
$SW_d$ . . . discharge switch
$N_{out}$ . . . output point
$CS_{(j)}$ . . . auxiliary capacitance line (j=1 to M)
$C_{1c}$ . . . liquid crystal capacitance
$C_s$ auxiliary capacitance
$E_c$ . . . common electrode
$E_p$ . . . pixel electrode
$V_{com}$ . . . counter voltage
$V_{cs}$ . . . auxiliary capacitance line voltage
$V_{clm}$ . . . clamp voltage
$V_{clm0}$ . . . initial clamp voltage value
$V_{clm1}$ . . . normal clamp voltage value
$V_{pp}$ . . . rectangular-wave voltage
$\Delta V_c$ . . . voltage difference between auxiliary capacitance line voltage and counter voltage

BEST MODES FOR CARRYING OUT THE INVENTION

Hereinafter, embodiments of the present invention will be described with reference to the accompanying drawings.

1. First Embodiment 1.1 Overall Configuration

FIG. 1 is a block diagram illustrating the overall configuration of a liquid crystal display device according to a first embodiment of the present invention. The liquid crystal display device includes: a liquid crystal panel 100; a driver circuit, which includes a data signal line driver circuit 200, a scanning signal line driver circuit 300, a common electrode driver portion 400, and an auxiliary electrode driver portion 450; and a control circuit 600 acting as a display control circuit. Note that the following description will be given on the assumption that the liquid crystal display device employs the line inversion drive mode, and counter AC drive is applied, but the present invention is not limited to such a drive mode. Here, the "counter AC drive" is intended to mean that, in order to minimize the amplitude of voltage on the data signal lines in the liquid crystal display device of the line inversion drive mode, the potential of the common electrode, i.e., the value of the counter voltage, is changed in accordance with the line inversion drive.

The liquid crystal panel 100 consists of a pair of electrode substrates having a liquid crystal layer sandwiched therebetween, and each electrode substrate has a polarizing plate attached to its outer surface, so that a white display is effected when no voltage is applied to the liquid crystal layer. Specifically, in the present embodiment, the liquid crystal panel 100 used is of a normally-white type and the transmittance of the liquid crystal panel 100 is maximized when the voltage applied to the liquid crystal layer is substantially 0.

In the liquid crystal panel 100, one of the pair of electrode substrates is an active-matrix substrate called a "TFT substrate", and the TFT substrate 102 includes an insulating substrate, such as glass, on which a plurality of data signal lines $S_{(1)}$ to $S_{(N)}$ and a plurality of scanning signal lines $G_{(1)}$ to $G_{(M)}$ are provided in the form of a lattice, so as to cross each other, and auxiliary electrodes are formed by a plurality of auxiliary capacitance lines $CS_{(1)}$ to $CS_{(M)}$ extending in parallel to the scanning signal lines $G_{(1)}$ to $G_{(M)}$. The other one of the pair of electrode substrates is called a counter substrate 104, in which a common electrode $E_c$, and an alignment layer are sequentially layered over the entirety of an insulating substrate such as glass.

The liquid crystal panel 100 has a plurality (N×M) of pixel formation portions $P_{(i,j)}$ provided in the form of a matrix, each pixel formation portion being associated with one of the intersections between the data signal lines $S_{(1)}$ to $S_{(N)}$ and the scanning signal lines $G_{(1)}$ to $G_{(M)}$. The pixel formation portions $P_{(1,1)}$ to $P_{(N,M)}$ each have a thin-film transistor (TFT) 10 acting as a switching element, and a pixel electrode EP, which are both formed on the TFT substrate 102, and each pixel formation portion being associated with one of the pixels constituting an image to be displayed. The common electrode EC and the liquid crystal layer are provided in common for the pixel formation portions $P_{(1,1)}$ to $P_{(N,M)}$, liquid crystal capacitances $C_{1c}$ are formed by the pixel electrodes $E_p$, the common electrode $E_c$, and the liquid crystal layer sandwiched therebetween, and auxiliary capacitances $C_s$ are formed by the pixel electrodes $E_c$ and the auxiliary capacitance lines $CS_{(j)}$.

Each pixel formation portion $P_{(i,j)}$ has a circuit configuration as shown in (A) of FIG. 2 (hereinafter, when the pixel formation portion $P_{(i,j)}$ is described from the circuit perspective, it is referred to as a "pixel circuit"). Specifically, each pixel formation portion $P_{(i,j)}$, when referred to as the "pixel circuit", includes the TFT 10 acting as a switching element, as well as the liquid crystal capacitance $C_{1c}$ and the auxiliary capacitance $C_s$, and the TFT 10 has a gate terminal connected to the scanning signal line $G_{(i)}$ associated with the pixel formation portion $P_{(i,j)}$, a source terminal connected to the data signal line $S_{(i)}$ associated with the pixel formation portion $P_{(i,j)}$, and a drain terminal connected to the pixel electrode EC, which constitutes the liquid crystal capacitance $C_{1c}$ and the auxiliary capacitance $C_s$. Note that in the following description, the symbol "$C_{lc}$" also denotes the capacitance value of the liquid crystal capacitance, and the symbol "$C_s$" also denotes the capacitance value of the auxiliary capacitance.

Incidentally, in some cases, the TFT 10 of a pixel formation portion $P_{(i,j)}$ is fixed in an opened state due to a manufacture defect or suchlike of the liquid crystal panel 100 (the TFT substrate 102), as shown in (B) of FIG. 2 (hereinafter, any pixel associated with such a pixel formation portion with a TFT fixed in an opened state is referred to as a "defective pixel"). In such cases, the pixel formation portion $P_{(i,j)}$ has a circuit configuration as shown in (C) of FIG. 2, and the potential $V_s$ at the pixel electrode $E_p$ (the potential at the source terminal of the TFT 10) is determined by the potential difference between the potential (counter voltage) $V_{com}$ of the common electrode $E_c$ and the potential (auxiliary capacitance line voltage) $V_{cs}$ of the auxiliary capacitance line $C_{s(j)}$, as well as the capacitance ratio between the liquid crystal capacitance $C_{lc}$ and the auxiliary capacitance $C_s$. That is, $$V_s = (C_s \cdot V_{cs} + C_{lc} \cdot V_{com})/(C_{lc} + C_s) \quad (1).$$

Note that in the following description, the capacitance $C_{lc} + C_s$, which is the sum of the liquid crystal capacitance $C_{lc}$ and the auxiliary capacitance $C_s$ (hereinafter, referred to as a "pixel capacitance"), is denoted by the symbol "$C_p$".

The controller 600, which acts as a display control circuit, generates a drive control signal for operating the data signal line driver circuit 200 (including an image signal $D_a$ by which to supply a voltage corresponding to the pixel value to each pixel electrode), and a drive control signal for operating the scanning signal line driver circuit 300, in accordance with an image signal $D_v$ and a control signal $C_t$, which are supplied from a CPU (central processing unit) (not shown) acting as an external main controller. In addition, the controller 600 generates control signals for operating the common electrode driver portion 400 and the auxiliary electrode driver portion 450 (e.g., a clamp voltage $V_{clm}$ to be supplied to the auxiliary electrode driver portion 450).

The common electrode driver portion 400 generates a counter voltage $V_{com}$ to be described later, in accordance with the control signal (not shown) or suchlike from the controller 600, and applies it to the common electrode $E_c$. In the present embodiment, the line inversion drive is carried out as described above, and in accordance with this, the value of the counter voltage $V_{com}$ alternates between a predetermined high voltage value $V_{cH}$ and a predetermined low voltage value $V_{cL}$ every horizontal period of an image display.

The auxiliary electrode driver portion 450 generates an auxiliary capacitance line voltage $V_{cs}$ to be described later as an auxiliary voltage, in accordance with the clamp voltage $V_{clm}$ or suchlike from the controller 600, and applies it to the auxiliary capacitance lines $CS_{(1)}$ to $CS_{(M)}$. The auxiliary capacitance line voltage VCS is a voltage in the same phase with the counter voltage $V_{com}$, and the value thereof alternates between two voltage values as in the case of the counter voltage $V_{com}$, but during the normal display state, it has a predetermined voltage difference $\Delta V_c$ relative to the counter voltage $V_{com}$. Note that in the configuration as shown in FIG. 1, the auxiliary electrode driver portion 450 is an element separated from the controller 600, but may be configured by using a portion of the controller 600 as described below.

The data signal line driver circuit 200 is connected to each data signal line $S_{(i)}$ (where i=1, 2, ..., N) on the liquid crystal panel 100, and generates a data signal to be applied to the data signal line $S_{(i)}$ in order to display an image on the liquid crystal panel 100, in accordance with the drive control signal from the controller 600. In addition, the scanning signal line driver circuit 300 is connected to each scanning signal line $G_{(j)}$ (where j=1, 2, ..., M) on the liquid crystal panel 100, and generates a scanning signal to be applied to the scanning signal line $G_{(j)}$, in accordance with the drive control signal from the controller 600. In order to write a data signal, which is to be applied to each data signal line $G_{(j)}$ by the data signal line driver circuit 200, to each pixel formation portion (its pixel capacitance $C_p = C_{lc} + C_s$) the scanning signal line driver circuit 300 applies the scanning signal to each scanning signal line $G_{(j)}$, thereby sequentially selecting each of the scanning signal lines $G_{(1)}$ to $G_{(M)}$ on the liquid crystal panel 100 for almost one horizontal period per frame period of the image display. Note that the data signal line driver circuit 200 and the scanning signal line driver circuit 300 may be mounted on the TFT substrate 102, or may be provided, for example, in such a form that the data signal line driver circuit 200 and soon are connected to wiring (the data signal lines, etc.) on the TFT substrate 102 via a flexible substrate. In addition, both or either of the data signal line driver circuit 200 and the scanning signal line driver circuit 300, along with the pixel circuits, may be integrally formed with a glass substrate, thereby forming a liquid crystal panel of a so-called driver monolithic or partially driver monolithic type.

In the liquid crystal panel 100 as described above, the counter voltage $V_{com}$ is supplied to the common electrode $E_c$, which acts as a counter electrode, by the common electrode driver portion 400, and a voltage according with an image to be displayed is supplied to each pixel electrode $E_p$ by the data signal line driver circuit 200 and the scanning signal line driver circuit 300. As a result, voltages according with the differences in potential between the pixel electrodes $E_p$ and the common electrode $E_c$ are applied to the liquid crystal layer sandwiched between the electrodes. Thus, optical modulation is performed on each portion of the liquid crystal layer, thereby implementing the image display. Note that the data signal line driver circuit 200 and the scanning signal line driver circuit 300 constitute a pixel electrode driver portion, which is a driver portion for supplying a voltage according with an image to be displayed to the pixel electrodes, each being associated with a pixel for that image, via the TFTs acting as switching elements.

1.2 Auxiliary Electrode Driver Portion

1.2.1 Basic Configuration and Operation

Figure 3:
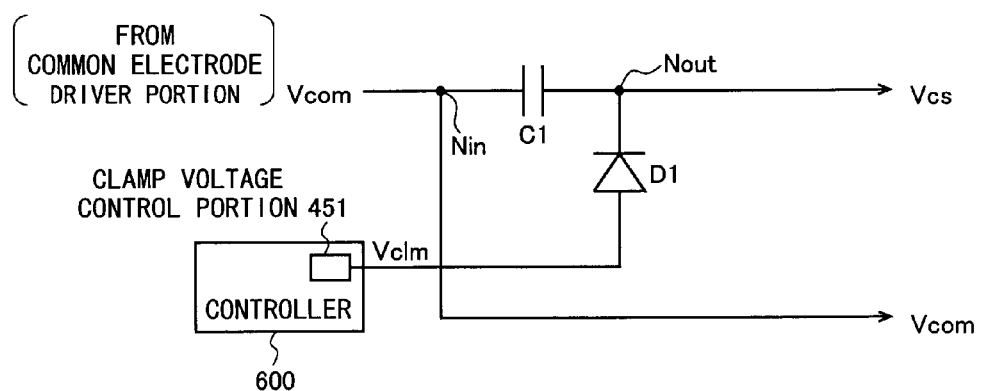
FIG. 3 is a circuit diagram illustrating the basic configuration of an auxiliary electrode driver portion in the first embodiment.

FIG. 3 is a circuit diagram illustrating the basic configuration of the auxiliary electrode driver portion 450 in the present embodiment. The auxiliary electrode driver portion 450 in the present embodiment includes as basic elements a capacitor $C_1$ which receives at one end the counter voltage $V_{com}$ supplied from the common electrode driver portion 400, a diode $D_1$ which has a cathode connected to the other end of the capacitor $C_1$, and a clamp voltage control portion 451 which supplies a clamp voltage $V_{clm}$ to be described later to an anode of the diode $D_1$. A voltage at a connecting point (hereinafter, referred to as an "output point") $N_{out}$ between the other end of the capacitor $C_1$ and the cathode of the diode $D_1$ is applied to the auxiliary capacitance lines $CS_{(1)}$ to $CS_{(M)}$ as an auxiliary capacitance line voltage $V_{cs}$ (see FIG. 1).

With such a configuration, the counter voltage $V_{com}$ is supplied to the output point $N_{out}$ after its direct-current component is blocked by the capacitor $C_1$, and the clamp voltage $V_{clm}$ is supplied to the output point $N_{out}$ via the diode $D_1$. Therefore, a voltage having its lower limit equal to the clamp voltage $V_{clm}$ and differing from the counter voltage $V_{com}$ only in terms of the direct-current component can be obtained at the output point $N_{out}$ as the auxiliary capacitance line voltage VCS. Specifically, the capacitor $C_1$ and the diode $D_1$ constitute a clamp circuit, which functions as an auxiliary voltage generation portion for generating the auxiliary capacitance line voltage $V_{cs}$ such that a voltage difference occurs between the counter voltage $V_{com}$ and the auxiliary capacitance line voltage $V_{cs}$, and the clamp voltage control portion 450 functions as a voltage difference control portion for altering the voltage difference. Note that in the present embodiment, the cathode of the diode $D_1$ is connected to the other end of the capacitor C1, i.e., the output point $N_{out}$, but the anode of the diode $D_1$ may be connected to the output point $N_{out}$ (i.e., the diode $D_1$ may be directed to the opposite direction). In such a case, voltage having it supper limit equal to the clamp voltage $V_{clm}$ and differing from the counter voltage $V_{com}$ only in terms of the direct-current component can be obtained at the output point $N_{out}$ as the auxiliary capacitance line voltage $V_{cs}$. Also, in the present embodiment, the clamp voltage control portion 451 is provided in the controller 600, but it may be provided separately from the controller.

Figure 4:
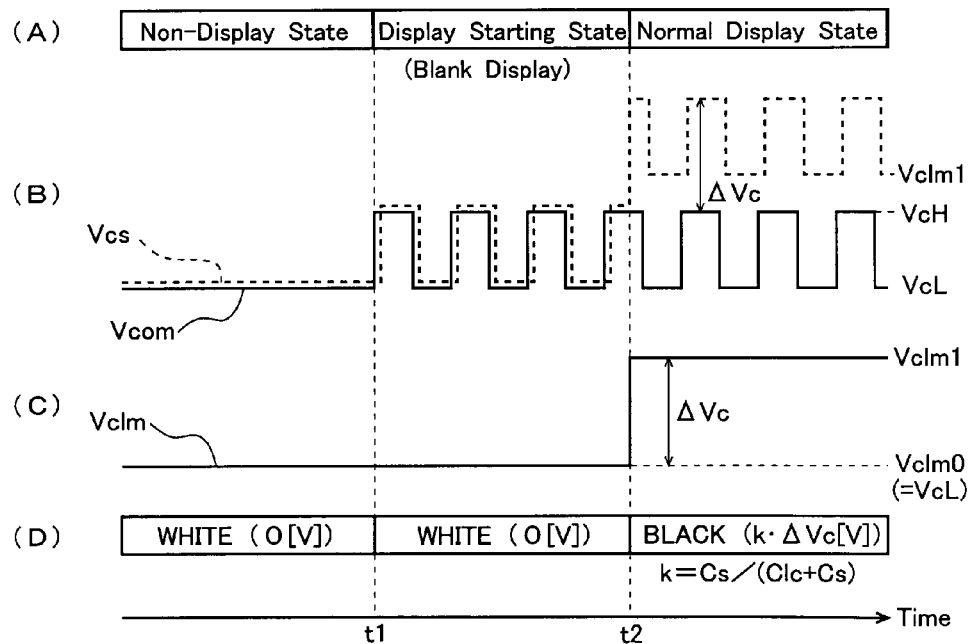
FIG. 4 is a diagram consisting of signal waveforms (B, C) for describing the operation of the auxiliary electrode driver portion in the first embodiment, and timing charts (A, D) illustrating operational states and display states of the liquid crystal display device.

FIG. 4 is a diagram consisting of signal waveforms for describing the operation of the auxiliary electrode driver portion 450 in the present embodiment. The counter voltage $V_{com}$, the auxiliary capacitance line voltage $V_{cs}$, and the clamp voltage $V_{clm}$ change as shown in (B) and (C) of FIG. 4, in accordance with whether the liquid crystal display device is in the non-display state, display starting state, or normal display state. Here, as in the case of the counter voltage for the conventional liquid crystal display device of the line inversion drive mode, the counter voltage $V_{com}$ is a predetermined low voltage value $V_{cL}$ during the non-display state, and alternates between a predetermined high voltage value VCH and the predetermined low voltage value $V_{cL}$ every horizontal period of the image display during the display starting state and the normal display state (see the waveform indicated by the solid line in (B) of FIG. 4). In contrast, the clamp voltage $V_{clm}$ outputted from the clamp voltage control portion 451 has a value $V_{clm0}$ (hereinafter, referred to as an "initial clamp voltage value"), which is equal to the low voltage value $V_{cL}$, during the non-display state and the display starting state, and a predetermined voltage value (hereinafter, referred to as a "normal clamp voltage value") $V_{clm1}$ during the normal display state. The normal clamp voltage value $V_{clm1}$ is determined in accordance with, for example, the VT curve (FIG. 18) for the liquid crystal panel and the capacitance ratio between the liquid crystal capacitance $C_{lc}$ and the auxiliary capacitance $C_s$, such that any pixel (defective pixel) associated with the pixel formation portion $P_{(i,j)}$ including an open fault TFT is displayed in black (the details will be described later).

By controlling the clamp voltage $V_{clm}$ in accordance with the state of the liquid crystal display device as described above, the auxiliary capacitance line voltage $V_{cs}$ outputted from the auxiliary electrode driver portion 450 shown in FIG. 3 changes as indicated by the dotted line in (B) of FIG. 4 (in (B) of FIG. 4, for ease of viewing, the waveform indicated by the solid line and the waveform indicated by the dotted line are drawn so as to relatively deviate from each other). Specifically, as in the case of the counter voltage $V_{com}$, the auxiliary capacitance line voltage $V_{cs}$ remains unchanged at the predetermined low voltage value during the non-display state; it has the same amplitude and is in the same phase as the counter voltage $V_{com}$ during the display starting state, and the voltage difference relative to the counter voltage $V_{com}$ is 0; it has the same amplitude and is in the same phase as the counter voltage $V_{com}$ during the normal display state, and the voltage difference relative to the counter voltage $V_{com}$ is $\Delta V_c = V_{clm1} - V_{clm0} = V_{clm1} - V_{cL}$.

Figure 16:
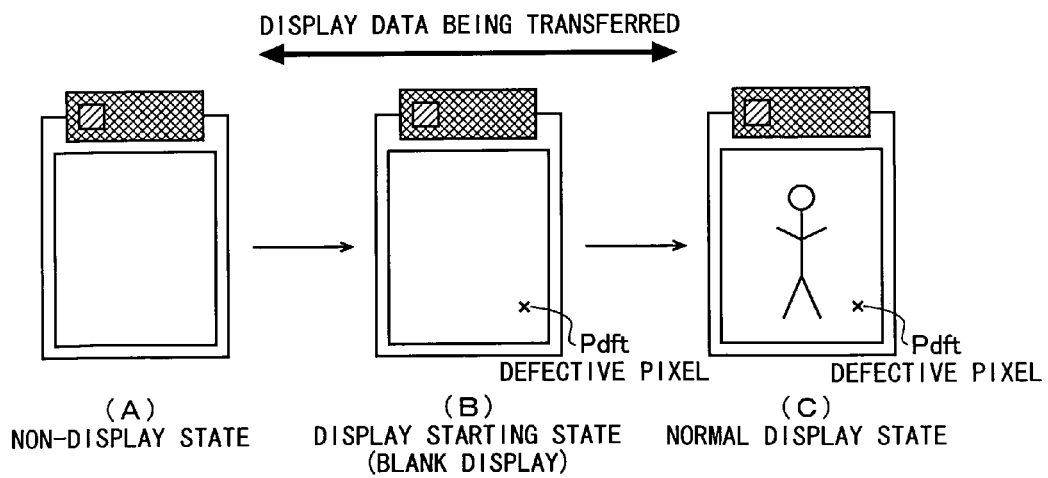
FIG. 16 consists of diagrams (A, B, C) for describing issues in the case of effecting a blank display during the display starting state in order to avoid the abnormal display due to remaining charge.

As described above, the display starting state refers to the state of the liquid crystal display device during a period of transition from the non-display state to the normal display state, and in this period, the first display data after activation of the liquid crystal display device is transferred from an external main controller (e.g., a CPU of an electronic device, such as a cell phone, which has the liquid crystal display device as a liquid crystal module) to (the memory device in) the controller 600 of the liquid crystal display device. Accordingly, the display starting state lasts from point $t_1$ at which the liquid crystal display device is activated, for example, by supplying the power to point $t_2$ at which the external main controller completely transfers the first display data to the liquid crystal display device. During the display starting state, the data signal line driver circuit 200, the scanning signal line driver circuit 300, and the common electrode driver portion 400 are controlled in such a manner that the full-screen white display is effected as a blank display (see FIG. 16). Accordingly, in order to render any defective pixel less noticeable, the clamp voltage $V_{clm}$ may be controlled as shown in (D) of FIG. 4, such that the defective pixel is displayed in white during the display starting state and in black during the normal display state.

Therefore, in the present embodiment, the clamp voltage control portion 451 changes the clamp voltage $V_{clm}$ from the value $V_{clm0}$ equal to the low voltage value $V_{cL}$ to the predetermined value $V_{clm1}$ at the point of switching from the display starting state to the normal display state, i.e., the normal display start point $t_2$. Concretely, in the case where the controller 600 controls the data signal line driver circuit 200 and so on such that a blank display is effected during the display starting state for a predetermined period of time determined by an internal timer of the controller, the clamp voltage $V_{clm}$ outputted from the clamp voltage control portion 451 is changed from the initial clamp voltage value $V_{clm0}$ $(=V_{cL})$ to the normal clamp voltage value $V_{clm1}$, in accordance with a signal outputted from the timer. Also, in the case where the normal display is started in response to a display starting signal $S_{on}$ supplied from outside the liquid crystal display device, the clamp voltage $V_{clm}$ outputted from the clamp voltage control portion 451 is changed from the initial clamp voltage value $V_{clm0}$ $(=V_{cL})$ to the normal clamp voltage value $V_{clm1}$ in accordance with the display starting signal $S_{on}$.

The pixel circuit associated with the defective pixel ((B) of FIG. 2) is equivalent to the circuit shown in (C) of FIG. 2, and a voltage $V_{cs} - V_{com}$ corresponding to the difference between the auxiliary capacitance voltage $V_{cs}$ and the counter voltage $V_{com}$ is applied between opposite ends of a circuit in which the liquid crystal capacitance $C_{1c}$ and the auxiliary capacitance $C_s$ are connected in a series. As can be appreciated from the circuit configuration shown in FIG. 3, the applied voltage $V_{cs} - V_{com}$ is equal to the difference $V_{clm} - V_{cL}$ between the clamp voltage $V_{clm}$ and the low voltage $V_{cL}$. As described above, the value of the clamp voltage $V_{clm}$ is $V_{clm0} = V_{cL}$ during the display starting state, and $V_{clm1}$ during the normal display state. Accordingly, the applied voltage $V_{cs} - V_{com}$ is 0 during the display starting state, and $V_{clm1} - V_{cL}$ during the normal display state. Incidentally, from equation (1), the voltage applied to the liquid crystal capacitance $C_{lc}$ in the pixel circuit (hereinafter, simply referred to as a "liquid crystal application voltage") is as follows:

$$|V_s - V_{com}| = C_s \cdot (V_{cs} - V_{com})/(C_{1c} + C_s) \qquad (2).$$

Accordingly, the liquid crystal application voltage is 0 during the display starting state, and $$C_s \cdot |V_{clm1} - V_{cL}|/(C_{1c} + C_s) \quad (3)$$

during the normal display state.

In the present embodiment, the clamp voltage value $V_{clm1}$ during the normal display state is set based on the VT curve for the liquid crystal panel 100 (see FIG. 18), such that the transmittance of the liquid crystal that corresponds to the liquid crystal application voltage indicated by the above equation (3) has a value equivalent to a black display. For example, in the case where the capacitance ratio $C_{1c}/C_s = 1/3$, by setting the clamp voltage value $V_{clm1}$ during the normal display state, such that $V_{clm1} - V_{cL} = 4$ [V] in view of the VT curve shown in FIG. 18, the liquid crystal application voltage $|V_s - V_{com}|$ for the defective pixel is 3 [V], as derived from the above equation (3), and therefore the defective pixel is displayed in black. On the other hand, during the display starting state, $|V_{cs} - V_{com}| = 0$ [V], and therefore the liquid crystal application voltage $|V_s - V_{com}|$ is also 0 [V] for the defective pixel, so that the defective pixel is displayed in white. Note that in this example, $V_{cs} \geq V_{com}$, but the transmittance of the liquid crystal is determined based on the effective value of the liquid crystal application voltage, and therefore the relationship may be such that $V_{cs} \leq V_{com}$.

By controlling the clamp voltage $V_{clm}$ from the clamp voltage control portion 451 based on the clamp voltage value $V_{clm0}$, $V_{clm1}$, as set above, the defective pixel is displayed in white during the non-display state and the display starting state (i.e. during the full-screen white display), and in black during the normal display state, as shown in (D) of FIG. 4.

Figure 5:
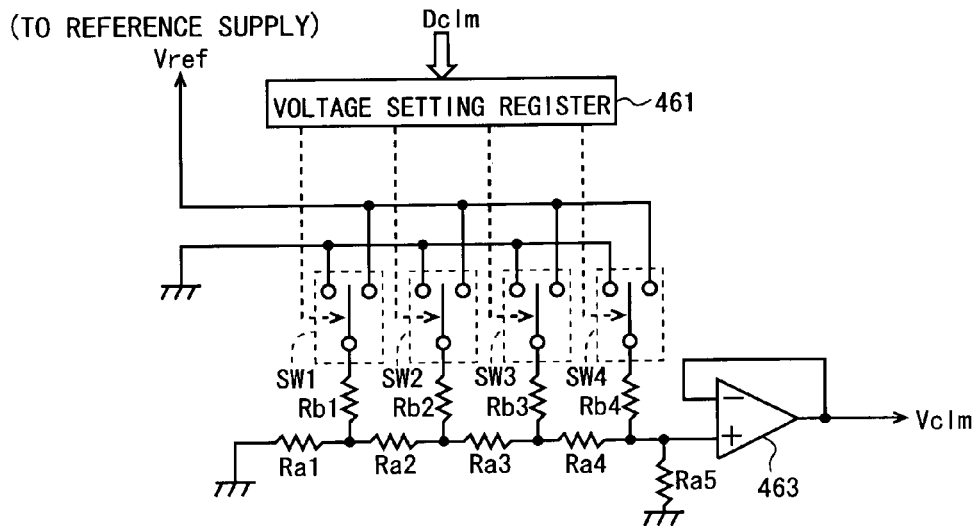
FIG. 5 is a circuit diagram illustrating an exemplary configuration of a clamp voltage generation circuit included in a clamp voltage control portion within the auxiliary electrode driver portion in the first embodiment.

The clamp voltage control portion 451 that outputs the clamp voltage $V_{clm}$ as described above can be implemented, for example, by using a DA conversion circuit in the controller 600. FIG. 5 is a circuit diagram illustrating an exemplary configuration of the DA conversion circuit acting as a clamp voltage generation circuit included in the clamp voltage control portion 451 in the present embodiment. The clamp voltage generation circuit according to the exemplary configuration includes: a resistor array consisting of five resistor elements $R_{a1}$ to $R_{a5}$ connected in a series; change-over switches $SW_1$ to $SW_4$ selectable between the ground voltage and a predetermined reference supply voltage $V_{ref}$ (hereinafter, referred to as a "reference voltage $V_{ref}$"; resistor elements $R_{b1}$ to $R_{b4}$ for connecting the change-over switches $SW_1$ to $SW_4$ to their respective connecting points between two resistor elements $R_{aj}$ and $R_{aj+1}$ (where j=1, 2, 3, 4) in the resistor array; a voltage setting register 461; and a voltage follower 463, the resistor array is grounded at its opposite ends, and the connecting point between the resistor elements $R_{a4}$ and $R_{a5}$ is connected to a non-inverting input terminal of an operational amplifier included in the voltage follower 463. The change-over switches $SW_1$ to $SW_4$ are controlled by data $D_{clm}$, which is written to the voltage setting register 461 as a voltage setting value. The writing of the data $D_{clm}$ to the voltage setting register 461 is carried out based on the function of the controller 600, and a portion of the controller 600 that writes the data $D_{ba}$ to the voltage setting register 461 constitutes the clamp voltage control portion 451.

With the configuration as described above, once the data $D_{clm}$ (the voltage setting value) is written to the voltage setting register 461 in the controller 600, a voltage corresponding thereto is inputted to the voltage follower 463, and subjected to impedance conversion before being outputted as the clamp voltage $V_{clm}$.

Incidentally, in the auxiliary electrode driver portion 450 in the present embodiment, the clamp voltage $V_{clm}$ is supplied to the output point $N_{out}$ (the connecting point between the capacitor $C_1$ and the diode $D_1$) via the diode $D_1$. Accordingly, in the case where the auxiliary electrode driver portion 450 consists only of elements of the above-described basic configuration (see FIG. 3), when transition from the normal display state to the blank display state or the non-display state (e.g., power-off state) occurs, the diode $D_1$ is brought into reversely-biased state even if the clamp voltage $V_{clm}$ is equal to 0 [V] or the low voltage value $V_{cL}$, and therefore it takes time (e.g., about 10 seconds) to discharge the capacitor $C_1$. During the discharge, a voltage corresponding to the normal clamp voltage value $V_{clm1}$ is applied to a portion of the liquid crystal layer that is associated with the defective pixel (the liquid crystal capacitance $C_{lc}$ in the pixel circuit including the open fault TFT), and therefore, in some cases, the defective pixel might be displayed in black or nearly black, and thus be recognized by humans. Therefore, the auxiliary electrode driver portion 450 in the present embodiment is configured to include additional elements for avoiding such a problem. Exemplary configurations of such an auxiliary electrode driver portion 450 in the present embodiment will be described below.

1.2.2 First Exemplary Configuration

Figure 6:
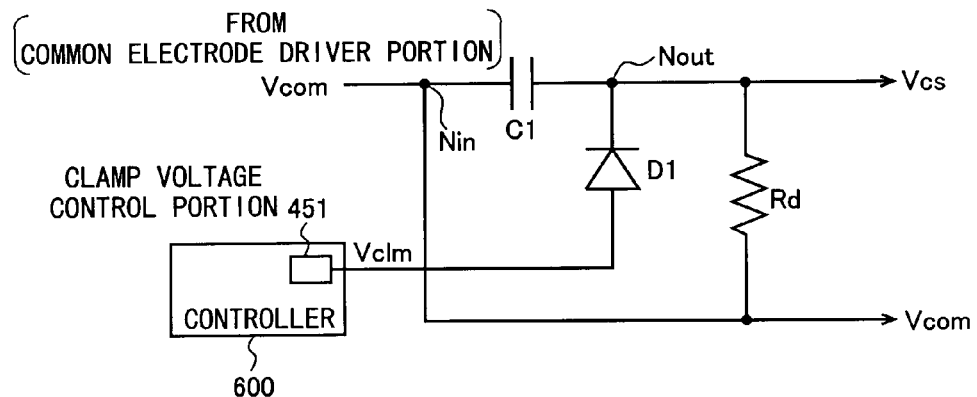
FIG. 6 is a circuit diagram illustrating a first exemplary configuration of the auxiliary electrode driver portion in the first embodiment.

FIG. 6 is a circuit diagram illustrating a first exemplary configuration of the auxiliary electrode driver portion 450 in the present embodiment. In the present exemplary configuration, a discharge resistor element $R_d$ is included in the basic configuration shown in FIG. 3 as an additional element. Since other elements are the same as those of the basic configuration, the same portions are denoted by the same reference characters, and descriptions thereof will be omitted. In the present exemplary configuration, the resistor element $R_d$ is connected at one end to an end (hereinafter, referred to as an "input point") $N_{in}$ of the capacitor $C_1$ to which the counter voltage $V_{com}$ is supplied, and at the other end to the output point $N_{out}$. That is, the resistor element $R_d$ is connected in parallel to the capacitor $C_1$. The resistor element $R_d$ has a resistance value (e.g., about 1 [M$\Omega$]) that is selected so as to be high enough not to affect generation of the auxiliary capacitance line voltage $V_{cs}$ adapted to the counter AC drive, but so as to allow the capacitor $C_1$ to be discharged in a sufficiently short period of time. For example, the resistor element $R_d$ having a resistance value of about 1 [M$\Omega$] is used for the capacitor $C_1$ having a capacitance value of about 2.2 [$\mu$F]. Thus, even if the clamp voltage $V_{clm}$ is changed from the normal clamp voltage value $V_{clm1}$ to a lower value (e.g., 0 [V]) it is possible to accelerate discharging of the capacitor $C_1$ without impairing the function of the auxiliary electrode driver portion 450.

With such a first exemplary configuration, it is possible to output substantially the same auxiliary capacitance line voltage $V_{cs}$ as in the basic configuration, while discharging the capacitor $C_1$ in a short period of time (e.g., several hundred [msec]), even if the clamp voltage $V_{clm}$ is changed from the normal clamp voltage value $V_{clm1}$ to a lower value. Thus, it is possible to prevent any defective pixel from being recognized by humans.

Figure 7:
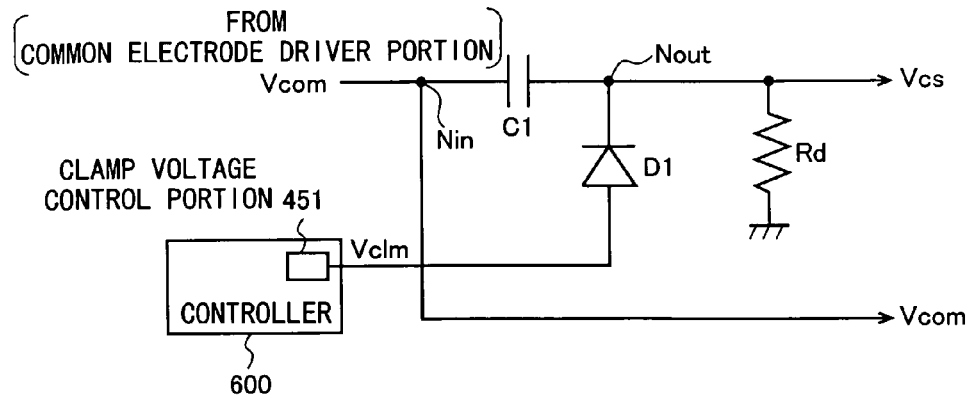
FIG. 7 is a circuit diagram illustrating a variant of the first exemplary configuration of the auxiliary electrode driver portion in the first embodiment.

Note that in the first exemplary configuration, the discharge resistor element $R_d$ is connected in parallel to the capacitor $C_1$, but instead of this, the discharge resistor element $R_d$ may be connected at one end to the output point $N_{out}$, and at the other end to, for example, a ground point, which does not cause any voltage difference between the auxiliary capacitance line voltage $V_{cs}$ and the counter voltage $V_{com}$ or causes only a small voltage difference relative to the counter voltage $V_{com}$. Specifically, the discharge resistor element $R_d$ may be connected between the output point $N_{out}$ and the ground point as shown in FIG. 7. Even with such a configuration, the counter voltage $V_{com}$ is also set at the ground potential during the power-off state, and therefore the capacitor $C_1$ is discharged via the resistor element $R_d$, resulting in no voltage difference between the auxiliary capacitance line voltage $V_{cs}$ and the counter voltage $V_{com}$.

1.2.3 Second Exemplary Configuration

Figure 8:
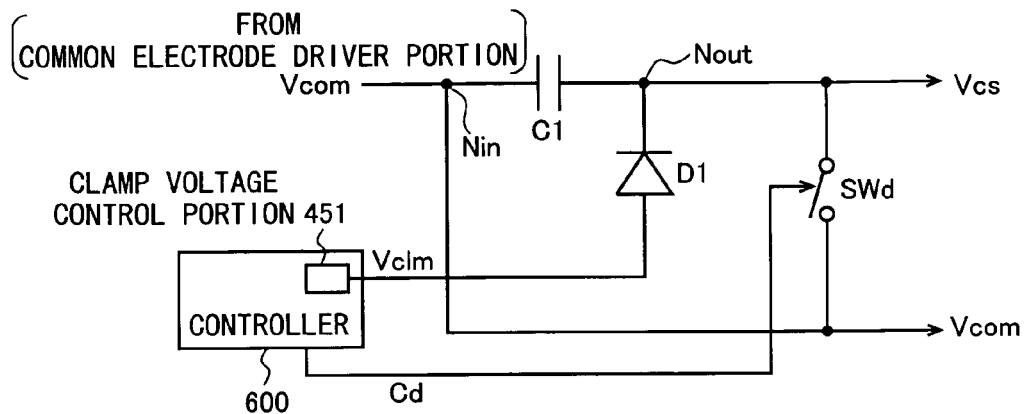
FIG. 8 is a circuit diagram illustrating a second exemplary configuration of the auxiliary electrode driver portion in the first embodiment.

FIG. 8 is a circuit diagram illustrating a second exemplary configuration of the auxiliary electrode driver portion 450 in the present embodiment. In the present exemplary configuration, a discharge switch $SW_d$ is included in the basic configuration shown in FIG. 3 as an additional element. Since other elements are the same as those in the basic configuration, the same portions are denoted by the same reference characters, and descriptions thereof will be omitted. The switch $SW_d$ has first and second terminals and a control terminal, and when a high level (H level) signal is supplied to the control terminal, the first terminal and the second terminal are electrically connected (the switch $SW_d$ is turned on), whereas when a low level (L level) signal is supplied to the control terminal, the first terminal and the second terminal are electrically disconnected (the switch $SW_d$ is turned off).

In the present exemplary configuration, the first terminal of the switch $SW_d$ is connected to the input point $N_{in}$, the second terminal is connected to the output point $N_{out}$, and a control signal for turning the switch $SW_d$ on/off is supplied from the controller 600 to the control terminal as a discharge control signal $C_d$. When the clamp voltage $V_{clm}$ has a normal clamp voltage value $V_{clm1}$ (i.e., when a voltage difference occurs between the auxiliary capacitance line voltage $V_{cs}$ and the counter voltage $V_{com}$, which is hereinafter referred to as "at the normal clamping time"), the discharge control signal $C_d$ is at L level, whereas when the clamp voltage $V_{clm}$ has an initial clamp voltage value $V_{clm0}$ (=$V_{cL}$) (i.e., no voltage difference occurs between the auxiliary capacitance line voltage $V_{cs}$ and the counter voltage $V_{com}$, which is hereinafter referred to as "at the initial clamping time"), the discharge control signal $C_d$ is at H level. Accordingly, the discharge switch $SW_d$ is turned off at the normal clamping time, and turned on at the initial clamping time. Specifically, the discharge switch $SW_d$ is opened/closed depending on whether the voltage difference is required between the auxiliary capacitance line voltage $V_{cs}$ and the counter voltage $V_{com}$. Thus, even when the clamp voltage $V_{clm}$ is changed from the normal clamp voltage value $V_{clm1}$ to a lower value (e.g., 0 [V]), it is possible to accelerate discharging of the capacitor $C_1$ without impairing the function of the auxiliary electrode driver portion 450. Note that as the discharge control signal $C_d$ for controlling on/off of the switch $SW_d$, a signal outputted from the controller 600 acting as a display control circuit can be used. In addition, the discharge switch $SW_d$ can be implemented by a MOS transistor or a thin-film transistor (TFT), and when the discharge switch $SW_d$ is implemented by a TFT, it can be formed in the liquid crystal: panel 100.

The second exemplary configuration as described above also makes it possible to achieve an effect similar to that achieved by the first exemplary configuration. Specifically, it is possible to output substantially the same auxiliary capacitance line voltage $V_{cs}$ as in the basic configuration, while instantaneously discharging the capacitor $C_1$ when the clamp voltage $V_{clm}$ is changed from the normal clamp voltage value $V_{clm1}$ to the initial clamp voltage value $V_{clm0}$ (=$V_{cL}$). Thus, it is possible to prevent any defective pixel from being recognized by humans.

Figure 9:
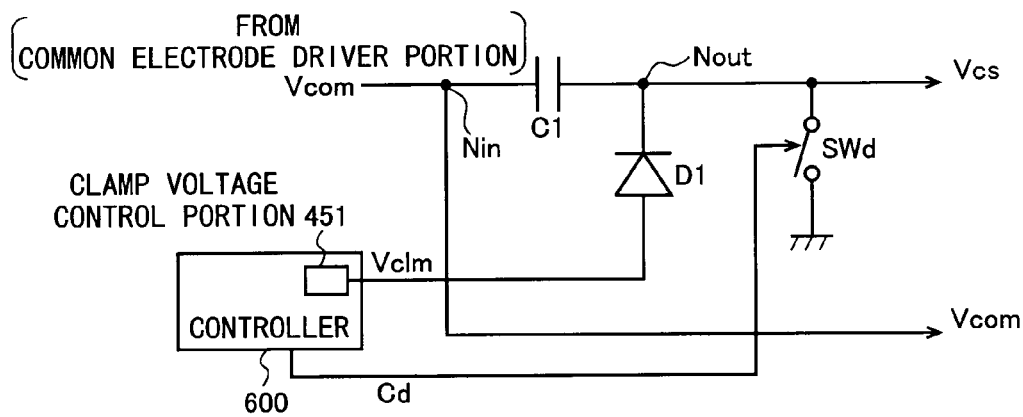
FIG. 9 is a circuit diagram illustrating a variant of the second exemplary configuration of the auxiliary electrode driver portion in the first embodiment.

Note that in the second exemplary configuration, the discharge switch $SW_d$ is connected in parallel to the capacitor $C_1$, but instead of this, the discharge switch $SW_d$ may be connected at the first terminal to the output point $N_{out}$, and at the second terminal to, for example, a ground point, which does not cause any voltage difference between the auxiliary capacitance line voltage $V_{cs}$ and the counter voltage $V_{com}$ or causes only a small voltage difference relative to the counter voltage $V_{com}$. Specifically, the discharge resistor element $R_d$ may be connected between the output point $N_{out}$ and the ground point as shown in FIG. 9. Even with such a configuration, the counter voltage $V_{com}$ is also set at the ground potential during the power-off state, and therefore the capacitor $C_1$ is discharged via the switch $SW_d$, resulting in no voltage difference between the auxiliary capacitance line voltage $V_{cs}$ and the counter voltage $V_{com}$.

1.2.4 Other Exemplary Configurations

Figure 10:
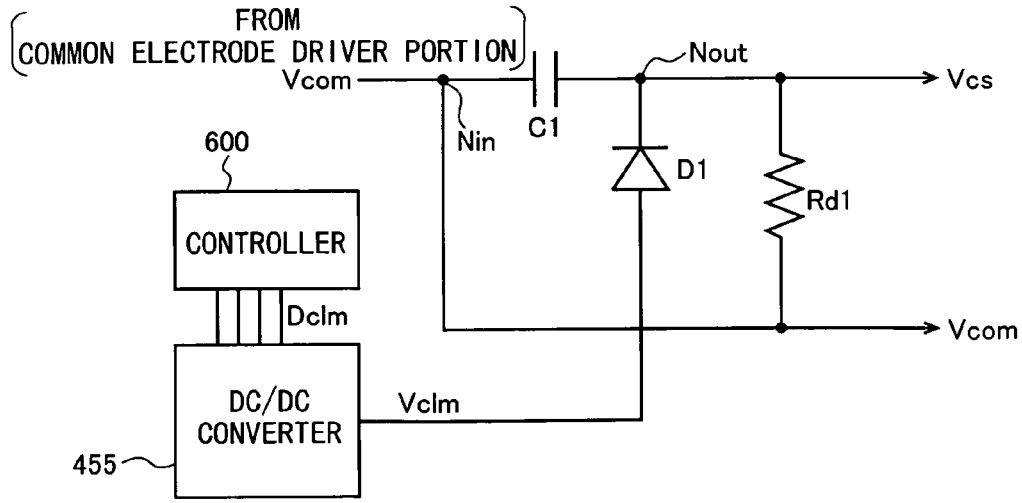
FIG. 10 is a circuit diagram illustrating another exemplary configuration of the auxiliary electrode driver portion in the first embodiment.

FIG. 10 is a circuit diagram illustrating another exemplary configuration of the auxiliary electrode driver portion 450 in the present embodiment. The present exemplary configuration is the same as the first exemplary configuration shown in FIG. 6, except that a DC/DC converter 455 including a DA conversion circuit is provided external to the controller 600 as a clamp voltage generation circuit of the clamp voltage control portion 451. Since other elements are the same as those in the first exemplary configuration, the same portions are denoted by the same reference characters, and descriptions thereof will be omitted. Note that the clamp voltage control portion 451 in the present exemplary configuration is implemented by the controller 600 (or a portion thereof) and the DC/DC converter 455.

With such a configuration, appropriate clamp voltage setting data $D_{clm}$ is supplied to the DC/DC converter 455, which is provided for driving the liquid crystal panel 100, making it possible to generate the clamp voltage $V_{clm}$ in accordance with the properties of the liquid crystal used in the liquid crystal panel 100. Normally, the controller 600 operates with low voltage, and therefore, with the above configuration, it is possible to deal with the case where a high clamp voltage is required.

Note that in the variant of the first exemplary configuration (FIG. 7), the second exemplary configuration (FIG. 8), or the variant of the second exemplary configuration (FIG. 9) also, the clamp voltage control portion 451 may be implemented by the controller 600 (or a portion thereof) and the DC/DC converter 455 as shown in FIG. 10.

Figure 11:
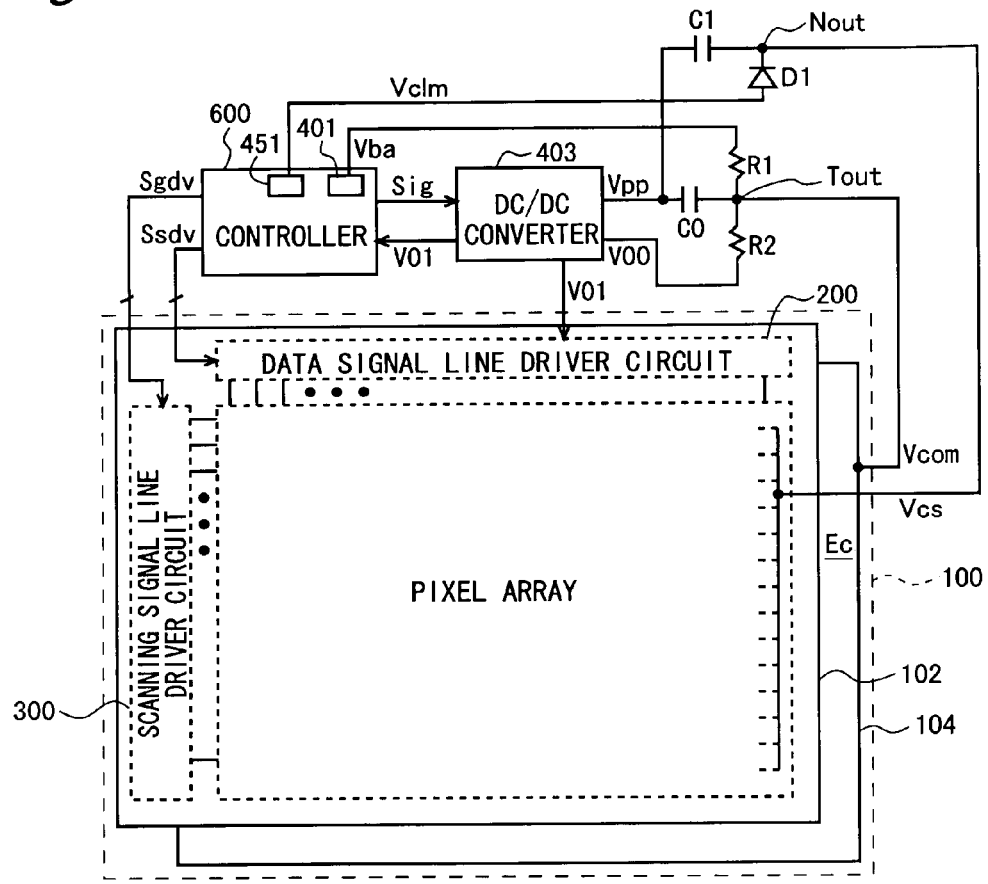
FIG. 11 is a circuit diagram illustrating yet another exemplary configuration of the auxiliary electrode driver portion in the first embodiment, along with the overall configuration of the liquid crystal display device.

FIG. 11 is a circuit diagram illustrating yet another exemplary configuration of the auxiliary electrode driver portion 450 in the present embodiment, along with the overall configuration of the liquid crystal display device (including the configuration of the common electrode driver portion 400). This exemplary configuration will be described below.

The liquid crystal display device shown in FIG. 11 is a TFT-LCD device in which the counter AC drive is applied, and the device includes: a liquid crystal panel 100; a data signal line driver circuit 200 and a scanning signal line driver circuit 300, which are mounted on the liquid crystal panel 100; a controller 600 acting as a display control circuit; a DC/DC converter 403 acting as a power supply circuit; a first resistor element $R_1$, a second resistor element $R_2$, and a capacitor $C_0$, which are elements of a common electrode driver portion; and a capacitor $C_1$ and a diode $D_1$, which are elements of an auxiliary electrode driver portion.

The liquid crystal panel 100 includes a TFT substrate 102 and a counter substrate 104, which have a liquid crystal layer sandwiched therebetween, and the TFT substrate 102 includes an insulating substrate, such as glass, on which a plurality of data signal lines and a plurality of scanning signal lines are provided in the form of a lattice, so as to cross each other, and a plurality of pixel circuits (pixel formation portions) are provided in the form of a matrix at intersections between the data signal lines and the scanning signal lines (hereinafter, the pixel circuits provided in the form of a matrix are collectively referred to as a "pixel array"). The data signal line driver circuit 200 and the scanning signal line driver circuit 300 are mounted on the TFT substrate 102, and respectively connected to the data signal lines and the scanning signal lines.

The controller 600 generates a drive control signal (including an image signal for supplying a voltage equivalent to a pixel value to each pixel electrode) $S_{sdv}$ for operating the data signal line driver circuit 200, and a drive control signal $S_{gdv}$ for operating the scanning signal line driver circuit 300, in accordance with an image signal and a control signal which are supplied from an external signal source (not shown). In addition, the controller 600 includes a DA conversion circuit 401 for outputting a bias voltage $V_{ba}$ for driving a common electrode $E_c$, and a clamp voltage control portion 451 for outputting a clamp voltage $V_{com}$ for driving auxiliary capacitance lines $CS_{(1)}$ to $CS_{(M)}$.

In accordance with a control signal $S_{ig}$ from the controller 600, the DC/DC converter 403 generates a direct-current voltage $V_{01}$ as a power voltage for the controller 600, the data signal line driver circuit 200, etc., based on direct-current voltage supplied by another power source (e.g., a power source of an electronic device (not shown), such as a cell phone, which includes the liquid crystal display device) In addition, the DC/DC converter 403 outputs a rectangular-wave voltage $V_{pp}$ for driving the common electrode $E_c$, and a reference voltage $V_{00}$.

The bias voltage $V_{ba}$ outputted from the DA conversion circuit 401 in the controller 600 is supplied to one end of the first resistor element $R_1$, which is connected at the other end to one end of the second resistor element $R_2$. The reference voltage $V_{00}$ outputted from the DC/DC converter 403 is supplied to the other end of the second resistor element $R_2$, so that the second resistor element $R_2$ is grounded at that other end, and the bias voltage $V_{ba}$ is applied as a direct-current voltage between opposite ends of a resistor array consisting of the first and second resistor elements $R_1$ and $R_2$. In addition, the capacitor $C_0$ is connected at one end to a connecting point $T_{out}$ between the first resistor element $R_1$ and the second resistor element $R_2$, and the rectangular-wave voltage $V_{pp}$ outputted from the DC/DC converter 403 is supplied to the other end of the capacitor $C_0$. As such, the first resistor element $R_1$ and the second resistor element $R_2$ constitute the resistor array for dividing the bias voltage $V_{ba}$, and the capacitor $C_0$ functions as a coupling capacitor for supplying the rectangular-wave voltage $V_{pp}$ to the connecting point $T_{out}$ in the resistor array.

The DA conversion circuit 401 in the controller 600, the DC/DC converter 403, the first and second resist or elements $R_1$ and $R_2$, and the capacitor $C_0$ constitute a common electrode driver portion, and a voltage at the connecting point (hereinafter, referred to as the "output point") $T_{out}$ between the first resistor element $R_1$ and the second resistor element $R_2$ is supplied to the common electrode $E_c$ of the liquid crystal panel 100 as a counter voltage $V_{com}$.

The auxiliary electrode driver portion based on such a configuration of the common electrode driver portion includes the capacitor $C_1$, the diode $D_1$, and the clamp voltage control portion 451 in the controller 600. The rectangular-wave voltage $V_{pp}$ outputted from the DC/DC converter 403 is supplied to one end of the capacitor $C_1$, the clamp voltage $V_{clm}$ from the clamp voltage control portion 451 is supplied to the anode of the diode $D_1$, the capacitor $C_1$ is connected to the cathode of the diode $D_1$, and a voltage at the connecting point $N_{out}$ is applied to the auxiliary capacitance lines $CS_{(1)}$ to $CS_{(M)}$ as the auxiliary capacitance line voltage $V_{cs}$. Note that the configuration and the operation of the clamp voltage control portion 451 are the same as in the above-described basic exemplary configuration, and therefore descriptions thereof will be omitted. In addition, although omitted in the present exemplary configuration, it is preferable that the discharge resistor element $R_d$ or switch $SW_d$ is connected as in the first or second exemplary configuration (see FIGS. 6, 7, 8, and 9).

In such an auxiliary electrode driver portion, unlike in the basic configuration and the first and second exemplary configurations, the rectangular-wave voltage $V_{pp}$ is supplied to one end of the capacitor $C_1$, but the rectangular-wave voltage $V_{pp}$ differs from the counter voltage $V_{com}$ only in terms of the direct-current component (the rectangular-wave voltage $V_{pp}$ is a voltage equivalent in alternating current to the counter voltage $V_{com}$), and is supplied to the connecting point $N_{out}$ serving as an output point for the auxiliary capacitance line voltage $V_{cs}$ after the direct-current component is blocked by the capacitor $C_1$. In addition, the clamp voltage $V_{clm}$ from the clamp voltage control portion 451 is supplied to the connecting point $N_{out}$ via the diode $D_1$. Accordingly, the auxiliary electrode driver portion in the present exemplary configuration also generates an auxiliary capacitance line voltage VCS similar to those generated by the basic exemplary configuration, etc.

1.3 Effect

According to the present embodiment as stated above, the clamp voltage $V_{clm}$ in the auxiliary electrode driver portion 450 is set at the initial clamp voltage value $V_{clm0}$ when the liquid crystal display device is in the display starting state, and at the normal clamp voltage value $V_{clm1}$ when the liquid crystal display device is in the normal display state ((C) of FIG. 4). Therefore, any defective pixel is displayed in white during the display starting state where the full-screen white display (blank display) is effected, and in black during the normal display state. Thus, it is possible to prevent any abnormal display due to remaining charge at the beginning of display, and render the defective pixel less noticeable not only during the normal display state but also during the display starting state.

2. Second Embodiment

Figure 12:
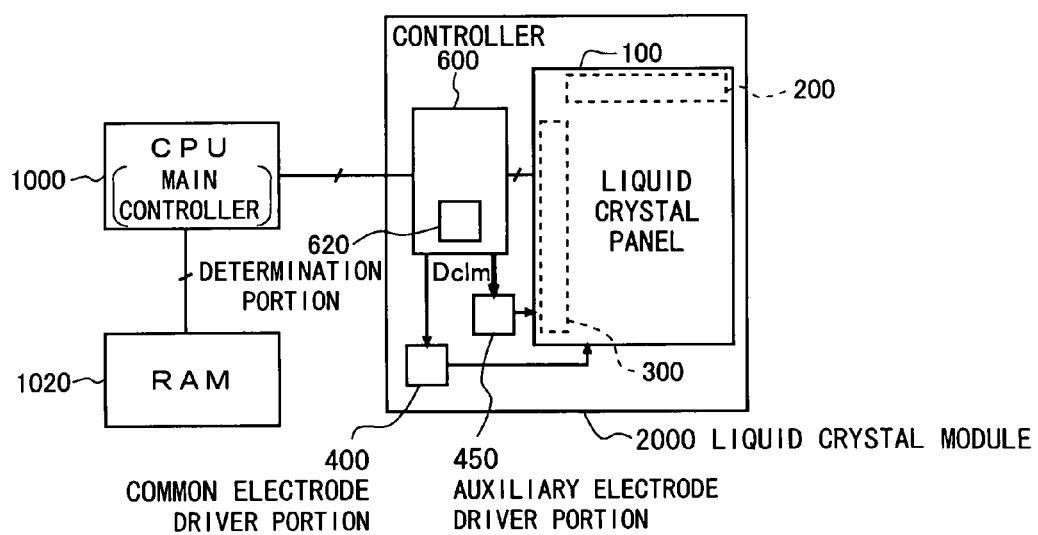
FIG. 12 is a functional block diagram illustrating the configuration of a liquid crystal display module acting as a liquid crystal display device according to a second embodiment of the present invention.
Figure 13:
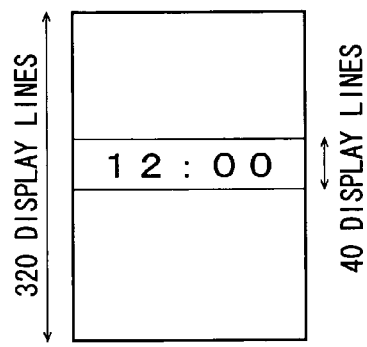
FIG. 13 is a diagram illustrating a display example where a white display is dominant.

FIG. 12 is a functional block diagram illustrating the configuration of a liquid crystal display module acting as a liquid crystal display device according to a second embodiment of the present invention. The liquid crystal module 2000 according to the present embodiment is used in an electronic device (hereinafter, referred to as a "main unit"), such as a cell phone, and the module includes: a controller (hereinafter, referred to as a "display controller") 600 acting as a display control circuit; a liquid crystal panel 100 having mounted thereon a data signal line driver circuit, a scanning signal line driver circuit, and the like; a common electrode driver portion 400; and an auxiliary electrode driver portion 450. The display controller 600 of such a liquid crystal module 2000 is connected to a CPU 1000 acting as a main controller for the main unit, and the CPU 1000 is connected to a RAM (random access memory) 1020 acting as a memory device for storing display data and suchlike. When the CPU 1000 reads the display data from the RAM 1020, and transfers it to the display controller 600 in the liquid crystal module 2000, the display controller 600 supplies an image signal based on the display data to the data signal line driver circuit in the liquid crystal panel 100, while supplying a predetermined control signal to the data signal line driver circuit, the scanning signal line driver circuit, the common electrode driver portion, and the auxiliary electrode driver portion 450. As a result, the data signal lines and scanning signal lines in the liquid crystal panel 100 are respectively driven by the data signal line driver circuit and the scanning signal line driver circuit, and the common electrode and the auxiliary capacitance lines on the liquid crystal panel are respectively driven by the common electrode driver portion 400 and the auxiliary electrode driver portion 450, so that an image represented by the display data is displayed on the liquid crystal panel 100. Note that the following description will be given on the assumption that the auxiliary electrode driver portion 450 is configured as shown in FIG. 10, but such a configuration is not restrictive.

Figure 14:
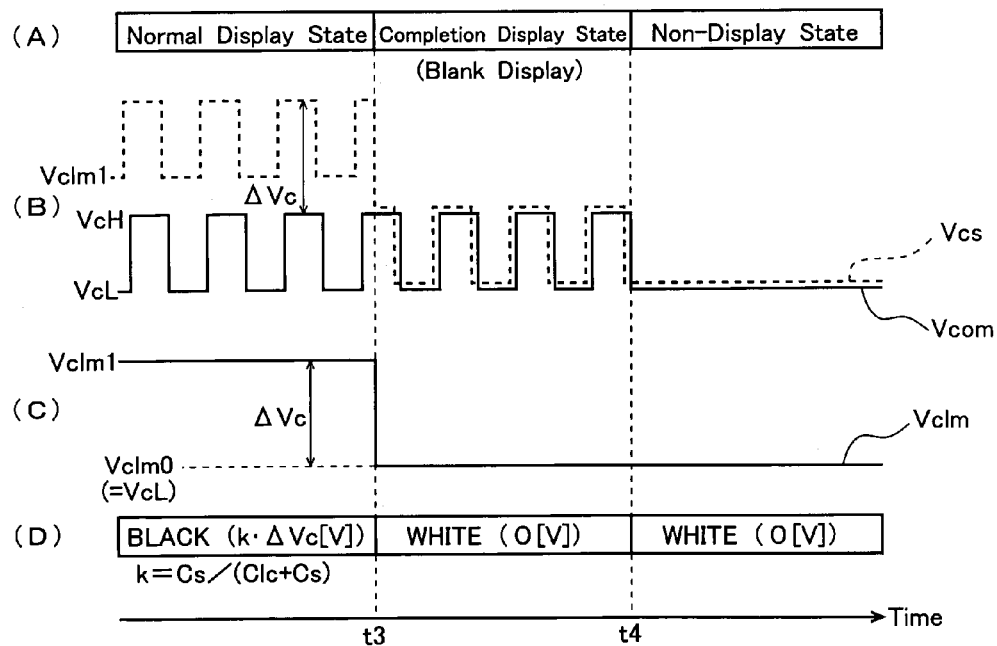
FIG. 14 is a diagram consisting of signal waveforms (B, C) for describing another embodiment of the present invention, and timing charts (A, D) illustrating operational states and display states of the liquid crystal display device.

The display controller 600 in such a present embodiment includes a determination portion 620 for determining whether a white display is dominant on the liquid crystal panel 100 (whether the white or nearly white color occupies a large proportion of the display) based on the display data transferred from the CPU 1000 in the main unit. The determination portion 620 calculates the proportion of the white or nearly white display by counting the number of white or nearly white pixels based on display data for one screen image, and determines whether the white display is dominant based on that calculation result. For example, in the case where a "clock display" as shown in FIG. 14 is provided on the screen with 320 display lines, the area for displaying a numerical value, such as time, is an area corresponding to, for example, 40 of the 320 display lines, and other display areas are displayed in white. In the case of such a clock display, the determination portion 620 determines that the white display is dominant.

The display controller 600 outputs clamp voltage setting data $D_{clm}$ to the auxiliary electrode driver portion 450 based on the determination result by the determination portion 620. As in the first embodiment, the clamp voltage setting data $D_{clm}$ outputted at this time has a value corresponding to the initial clamp voltage $V_{clm0}$ (FIG. 4) for the display starting state of the liquid crystal module 2000, and in addition, in the case where the determination portion 620 determines that the white display is dominant, the clamp voltage setting data $D_{clm}$ has a value corresponding to the initial clamp voltage $V_{clm0}$ even if the liquid crystal module 2000 is in the normal display state. Also, when the liquid crystal module 2000 is in the normal display state, and the determination portion 620 determines that the white display is not dominant, the clamp voltage setting data $D_{clm}$ has a value corresponding to the normal clamp voltage $V_{clm1}$.

According to the present embodiment as stated above, during the normal display state, the defective pixel is displayed in white when the white display is dominant, and in black when the white display is not dominant. Thus, it is possible not only to achieve an effect similar to that achieved by the first embodiment (the effect of rendering any defective pixel less noticeable during the display starting state where the full-screen white display is effected), but also to ensure that the defective pixel is rendered less noticeable during the normal display state.

Note that in the above embodiment, the determination portion 620 determines whether the white display is dominant based on the display data transferred from the CPU 1000 in the main unit, but instead of or in addition to this, for example, when effecting a display, such as a "clock display", in which the white display is dominant, the determination portion 620 may receive a predetermined command from the CPU 1000 in the main unit, and determine whether the white display is dominant based on that command.

3. Other Embodiments and Variants

Figure 15:
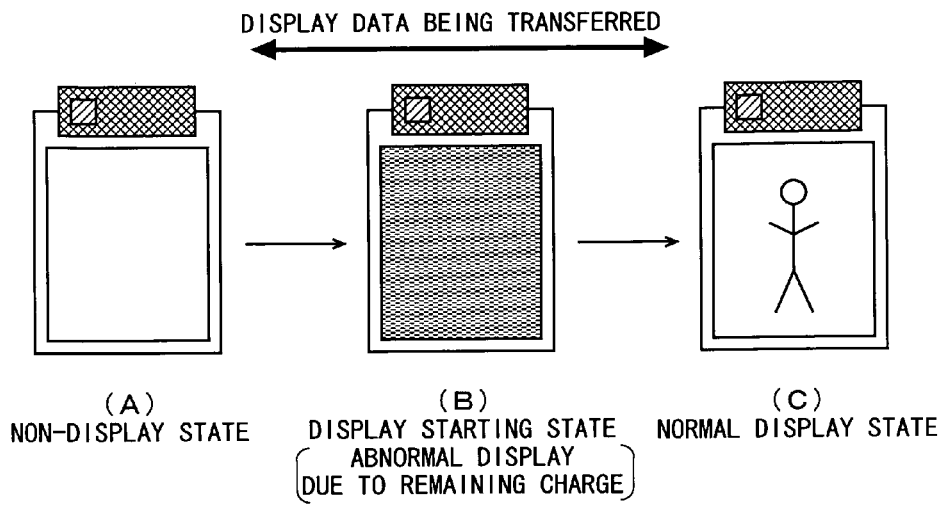
FIG. 15 consists of diagrams (A, B, C) for describing an abnormal display caused during display starting state due to remaining charge in a liquid crystal panel.

In the first and second embodiments, the present invention is applied on the assumption that once the liquid crystal display device is turned on, the liquid crystal display device transitions from the non-display state through the display starting state to the normal display state, and the full-screen white display is effected as a blank display during the display starting state in the course of transition (see FIG. 15). However, instead of or in addition to this, the present invention may be applied on the assumption that once the liquid crystal display device is turned off, the liquid crystal display device transitions from the normal display state through a completion display state to the non-display state, and the full-screen white display is effected as a blank display during the completion display state in the course of transition. In such a case, the auxiliary electrode driver portion is configured basically in the same manner as in the first or second embodiment, and the clamp voltage $V_{clm}$ is changed at the time of power-off as shown in (C) of FIG. 14, thereby changing the auxiliary capacitance line voltage $V_{cs}$ and the counter voltage $V_{com}$ as shown in (B) of FIG. 14 (in (B) of FIG. 14, for ease of viewing, the waveform indicated by the solid line and the waveform indicated by the dotted line are drawn so as to deviate from each other). As a result, it is possible to display any defective pixel in black during the normal display state, and in white during the completion display state, where the full-screen blank white display is effected, as shown in (D) of FIG. 14. Thus, it is possible to prevent any abnormal display due to remaining charge by means of the blank display during the completion display state, while rendering any defective pixel less noticeable not only during the normal display state, but also during the completion display state (the state of the full-screen white display).

The first and second embodiments have been described by taking as an example the liquid crystal panel in which the pixel electrodes and the common electrode are formed on different substrates, but these electrode structures are not restrictive, and the pixel electrodes and the common electrode may be formed on the same substrate, for example, as they are formed in the case of an IPS (in-plane switching) mode.

The first and second embodiments have been described by taking as an example the liquid crystal display device of the line inversion drive mode, in which the polarity of the voltage applied to the liquid crystal is inverted every horizontal scanning line, but the present invention is not limited to this, and can also be applied to any display devices of other inversion drive modes in which the counter AC drive is applied. For example, the present invention can be applied to any liquid crystal display device of an n-line inversion drive mode (where $n \geq 2$), in which the polarity of the voltage applied to the liquid crystal is inverted every n horizontal scanning lines, or a liquid crystal display device of frame inversion drive mode. Furthermore, the present invention can be applied to any liquid crystal display devices in which the counter AC drive is not applied, i.e., counter DC drive is applied. For example, in the case where the counter DC drive is applied, the auxiliary capacitance line voltage $V_{cs}$ may be equal to the counter voltage $V_{cs}$, such that any defective pixel is displayed in white when the full-screen blank white display is effected (during the display starting state, etc.), and the value of the auxiliary capacitance line voltage $V_{cs}$ may be larger or smaller than the counter voltage $V_{cs}$, such that any defective pixel is displayed in black during the normal display state.

As can be appreciated from the descriptions of the first and second embodiments, the present invention can be applied regardless of whether the liquid crystal panel is driven in accordance with a dot sequential system or a line sequential system, and the present invention can also be applied to, for example, any liquid crystal display device having change-over switches provided between the output terminal of the data signal line driver circuit and the data signal lines of the liquid crystal panel, so that the data signal lines can be driven in a time-sharing manner within each horizontal period.

Note that the foregoing is based on the assumption that the normally-white liquid crystal panel is used, but the present invention can be applied to any liquid crystal display device with a liquid crystal panel of normally-black mode, so long as the full-screen white display is effected as a blank display during the display starting state.

INDUSTRIAL APPLICABILITY

The present invention is applicable to display devices in which an image is displayed by applying a voltage between a plurality of pixel electrodes and a common electrode being opposed thereto, and the present invention is suitable for active-matrix liquid crystal display devices.

The invention claimed is:

1. A display device for displaying an image in accordance with differences in potential between a plurality of pixel electrodes and a common electrode provided in common for the pixel electrodes, the device comprising:
    switching elements provided in association with their respective pixel electrodes;
    auxiliary electrodes provided so as to form capacitances between the auxiliary electrodes and the pixel electrodes;
    a pixel electrode driver for supplying a voltage according with an image to be displayed to the pixel electrodes via the respective switching elements associated therewith;
    a common electrode driver for supplying a counter voltage to the common electrode; and
    an auxiliary electrode driver for supplying an auxiliary voltage to the auxiliary electrodes,
    wherein the auxiliary electrode driver includes,
        an auxiliary voltage generator for generating the auxiliary voltage such that a voltage difference occurs between the auxiliary voltage and the counter voltage, and
        a voltage difference controller for altering the voltage difference in accordance with the image to be displayed, a defective pixel being displayed by a pixel electrode associated with an open fault switching element, and
    the auxiliary voltage generator includes,
        a capacitor having one end to which the counter voltage or a voltage equal in alternating current to the counter voltage is supplied, and
        a diode connected at one end to the other end of the capacitor,
    the auxiliary electrode driver is configured to output a voltage at said other end of the capacitor as the auxiliary voltage, and
    the voltage difference controller is configured to generate and supply a clamp voltage to the other end of the diode, and changes a value of the clamp voltage, thereby altering the voltage difference.

2. The display device according to claim 1, wherein the auxiliary voltage generator has a resistor element connected in parallel to the capacitor.

3. A driver circuit, for a display device including a plurality of pixel electrodes, a common electrode provided in common for the pixel electrodes so as to form first capacitances between the common electrode and the pixel electrodes, and auxiliary electrodes provided so as to form second capacitances between the auxiliary electrodes and the pixel electrodes, the display device configured to display an image in accordance with differences in potential between the pixel electrodes and the common electrode, the circuit comprising:
    a pixel electrode driver for supplying a voltage in accordance with the image to the pixel electrodes;
    a common electrode driver for supplying a first counter voltage to the common electrode; and
    an auxiliary electrode driver for supplying a first auxiliary voltage to the auxiliary electrodes,
    wherein the auxiliary electrode driver includes,
        an auxiliary voltage generation for generating the first auxiliary voltage such that a voltage difference occurs between the first auxiliary voltage and the first counter voltage, and
        a voltage difference controller for altering the voltage difference
    the auxiliary voltage generator includes,
        a capacitor having one end to which the first counter voltage or a voltage equal in alternating current to the first counter voltage is supplied, and
        a diode connected at one end to the other end of the capacitor,
    the auxiliary electrode driver is configured to output a voltage at said other end of the capacitor as the first auxiliary voltage, and
    the voltage difference controller is configured to generate and supply a first clamp voltage to the other end of the diode, and change a value of the first clamp voltage, thereby altering the voltage difference.

* * * * *